United States Patent
Churchill et al.

(10) Patent No.: US 10,796,323 B2
(45) Date of Patent: Oct. 6, 2020

(54) MACHINE GENERATED RECOMMENDATION AND NOTIFICATION MODELS

(71) Applicant: eBay Inc., San Jose, CA (US)

(72) Inventors: Elizabeth Churchill, San Francisco, CA (US); Bryan Kent Ressler, Sammamish, WA (US); Atish Das Sarma, Mountain View, CA (US); Michael Gilbert, Seattle, WA (US)

(73) Assignee: eBay Inc., San Jose, CA (US)

( * ) Notice: Subject to any disclaimer, the term of this patent is extended or adjusted under 35 U.S.C. 154(b) by 796 days.

(21) Appl. No.: 14/861,741

(22) Filed: Sep. 22, 2015

(65) Prior Publication Data

US 2016/0086206 A1    Mar. 24, 2016

Related U.S. Application Data

(60) Provisional application No. 62/053,711, filed on Sep. 22, 2014.

(51) Int. Cl.
| | | |
|---|---|---|
| *G06Q 30/02* | (2012.01) | |
| *G06F 16/9535* | (2019.01) | |
| *G06F 16/335* | (2019.01) | |
| *H04L 29/08* | (2006.01) | |
| *G06F 16/23* | (2019.01) | |

(52) U.S. Cl.
CPC ......... *G06Q 30/0203* (2013.01); *G06F 16/23* (2019.01); *G06F 16/335* (2019.01); *G06F 16/337* (2019.01); *G06F 16/9535* (2019.01); *H04L 67/22* (2013.01); *H04L 67/306* (2013.01)

(58) Field of Classification Search
CPC ........... G06Q 30/0283; G06Q 30/0256; G06Q 30/0203; G06Q 30/02; G06Q 30/0269; G06Q 30/0643; G06F 16/583
USPC ........................................................ 705/7.32
See application file for complete search history.

(56) References Cited

U.S. PATENT DOCUMENTS

| | | | | |
|---|---|---|---|---|
| 5,960,407 A | * | 9/1999 | Vivona ................. | G06Q 20/10 705/14.44 |
| 6,009,406 A | * | 12/1999 | Nick ..................... | G06Q 10/06 700/95 |
| 6,134,531 A | * | 10/2000 | Trewitt .............. | G06Q 30/0203 705/1.1 |

(Continued)

FOREIGN PATENT DOCUMENTS

WO    WO-2016049060 A1    3/2016

OTHER PUBLICATIONS

"International Application Serial No. PCT/US2015/051515, International Search Report dated Jan. 6, 2016", 2 pgs.

(Continued)

*Primary Examiner* — Johnna R Loftis
(74) *Attorney, Agent, or Firm* — SBMC

(57) ABSTRACT

Systems and methods are presented for matching a buyer and a seller on a market place system and generating calibrated user profiles. In one such system a plurality of subjective estimations of value is received. The subjective estimations of value are a measure between a predetermined minimum value and a predetermined maximum value. A user profile is generated. A plurality of user actions corresponding to the plurality of subjective estimations of value is received. The user profile is calibrated based on the plurality of user actions.

20 Claims, 19 Drawing Sheets

(56) References Cited

U.S. PATENT DOCUMENTS

| | | | | |
|---|---|---|---|---|
| 7,010,144 B1* | 3/2006 | Davis | | G06T 1/0021 |
| | | | | 382/100 |
| 7,209,571 B2* | 4/2007 | Davis | | G06F 21/10 |
| | | | | 382/100 |
| 7,979,291 B2* | 7/2011 | Sussman | | G06Q 10/02 |
| | | | | 705/1.1 |
| 8,290,810 B2* | 10/2012 | Ramer | | G06F 17/30749 |
| | | | | 455/414.1 |
| 8,494,894 B2* | 7/2013 | Jaster | | G06F 17/30734 |
| | | | | 705/7.29 |
| 2002/0032638 A1* | 3/2002 | Arora | | G06Q 30/06 |
| | | | | 705/37 |
| 2002/0055882 A1* | 5/2002 | Van Gorkum | | G06Q 10/087 |
| | | | | 705/7.32 |
| 2004/0117239 A1* | 6/2004 | Mittal | | G06Q 30/02 |
| | | | | 705/7.32 |
| 2004/0230471 A1* | 11/2004 | Putnam Brookes | | |
| | | | | G06Q 10/0637 |
| | | | | 705/7.32 |
| 2005/0209909 A1* | 9/2005 | Dull | | G06Q 10/06375 |
| | | | | 705/7.32 |
| 2006/0041591 A1* | 2/2006 | Rhoads | | G06F 16/48 |
| 2007/0021165 A1* | 1/2007 | Ma | | A63F 13/10 |
| | | | | 463/1 |
| 2007/0077025 A1* | 4/2007 | Mino | | G06F 17/30256 |
| | | | | 386/241 |
| 2010/0274631 A1* | 10/2010 | McFall | | G06Q 30/0203 |
| | | | | 705/7.32 |
| 2011/0010216 A1* | 1/2011 | Bhogal | | G06F 21/105 |
| | | | | 705/7.31 |
| 2012/0066039 A1* | 3/2012 | Ang | | G06Q 10/109 |
| | | | | 705/14.5 |
| 2012/0173324 A1* | 7/2012 | Vallery | | G06Q 30/0224 |
| | | | | 705/14.25 |
| 2012/0323794 A1* | 12/2012 | Livshits | | G06Q 30/02 |
| | | | | 705/80 |
| 2013/0046582 A1* | 2/2013 | Ramer | | G06Q 10/02 |
| | | | | 705/7.32 |
| 2013/0204664 A1* | 8/2013 | Romagnolo | | G06Q 30/0203 |
| | | | | 705/7.32 |
| 2013/0282438 A1* | 10/2013 | Hunter | | G01S 1/02 |
| | | | | 705/7.32 |
| 2014/0074609 A1* | 3/2014 | Mesaros | | G06Q 30/02 |
| | | | | 705/14.54 |
| 2015/0112754 A1* | 4/2015 | Godsey | | G06Q 30/0201 |
| | | | | 705/7.29 |
| 2016/0055497 A1* | 2/2016 | Anneroth | | G06Q 30/0203 |
| | | | | 705/7.32 |

OTHER PUBLICATIONS

"International Application Serial No. PCT/US2015/051515, Written Opinion dated Jan. 6, 2016", 8 pgs.

"International Application Serial No. PCT/US2015/051515, International Preliminary Report on Patentability dated Apr. 6, 2017", 6 pgs.

* cited by examiner

FIG. 13

| YOU, KEVINHSU1688, ROCKYSTUPPERWARENTHENSOME AND 6 OTHERS ARE SELLING THIS FOR $20.00 TO $99.00 (CLICK OR TAP A USER TO BUY THIS ITEM) |||||
|---|---|---|---|---|
| MICHAEL $20.00 | KEVINHSU1688 $99.00 TAIWAN | ROCKYSTUPPERWA $44.50 | MARTITASLOV $99.99 | GARNERBOO $20.40 |
| YOU, KEVINHSU1688, ROCKYSTUPPERWARENTHENSOME, AND 7 OTHERS WANT THIS. |||||
| MICHAEL WANT NEED SPEND | KEVINHSU1688 WANT NEED SPEND | ROCKYSTUPPERWA WANT NEED SPEND | YOUMECHOOZ WANT NEED SPEND | MARTITASLO WANT NEED SPEND |

★ YOU AND MSHHD RECOMMENDED THIS ←——1410

MICHAEL                                JULY 14TH, 2014
    THIS WOULD LOOK GREAT ON MY DESK

1420

KEVINHSU1668                          JULY 5TH, 2014
    LOVE IT!!

1430

MARTITASLOVE                         JUNE 28TH, 2014
    DON'T KNOW WHAT THE FUSS IS ABOUT, I HAVE TWO OF THESE..

FIG. 14

MACHINE GENERATED RECOMMENDATION AND NOTIFICATION MODELS

REFERENCE TO RELATED APPLICATIONS

This Application claims the benefit of priority of U.S. Provisional Application No. 62/053,711, filed Sep. 22, 2014, which is hereby incorporated by reference in its entirety.

TECHNICAL FIELD

The subject matter disclosed herein generally relates to a graphical user interface. Specifically, the present disclosure addresses systems and methods to facilitate matching buyers and sellers using calibrated user profiles and notification models.

BACKGROUND

User profiles are often generated directly from information provided by a user and may be used to generate recommendations to the user. User profiles may be provided to enable the system to automatically populate information into the system for the user and otherwise save effort for the user in relation to predetermined aspects of interaction with the system. However, user profiles are usually not calibrated to a user to weight differing aspects of the information disclosed by the user. Systems taking advantage of user profiles are generally incapable learning or generating differing profile information based on actions taken by the user in conjunction with the user profile.

User profile information may be used to transmit notifications to a user along predetermined communications mechanisms. Unless given the capability to directly limit communication from the system, users often receive blanket notification without consideration of the user, user profile, or the content of the notification. For example, often systems transmitting notifications transmit the notifications without regard to time, location of the user, or aspects contained within the content of the notification. This lack of context to notifications may limit the effectiveness of the notification.

BRIEF DESCRIPTION OF THE DRAWINGS

Some embodiments are illustrated by way of example and not limitation in the figures of the accompanying drawings.

FIG. 13 is an illustration of an example graphical user interface of a client device, according to some example embodiments.

FIG. 14 is an illustration of an example graphical user interface of a client device, according to some example embodiments.

DETAILED DESCRIPTION

Example methods and systems are directed to matching buyers and sellers using calibrated user profiles and notification models. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
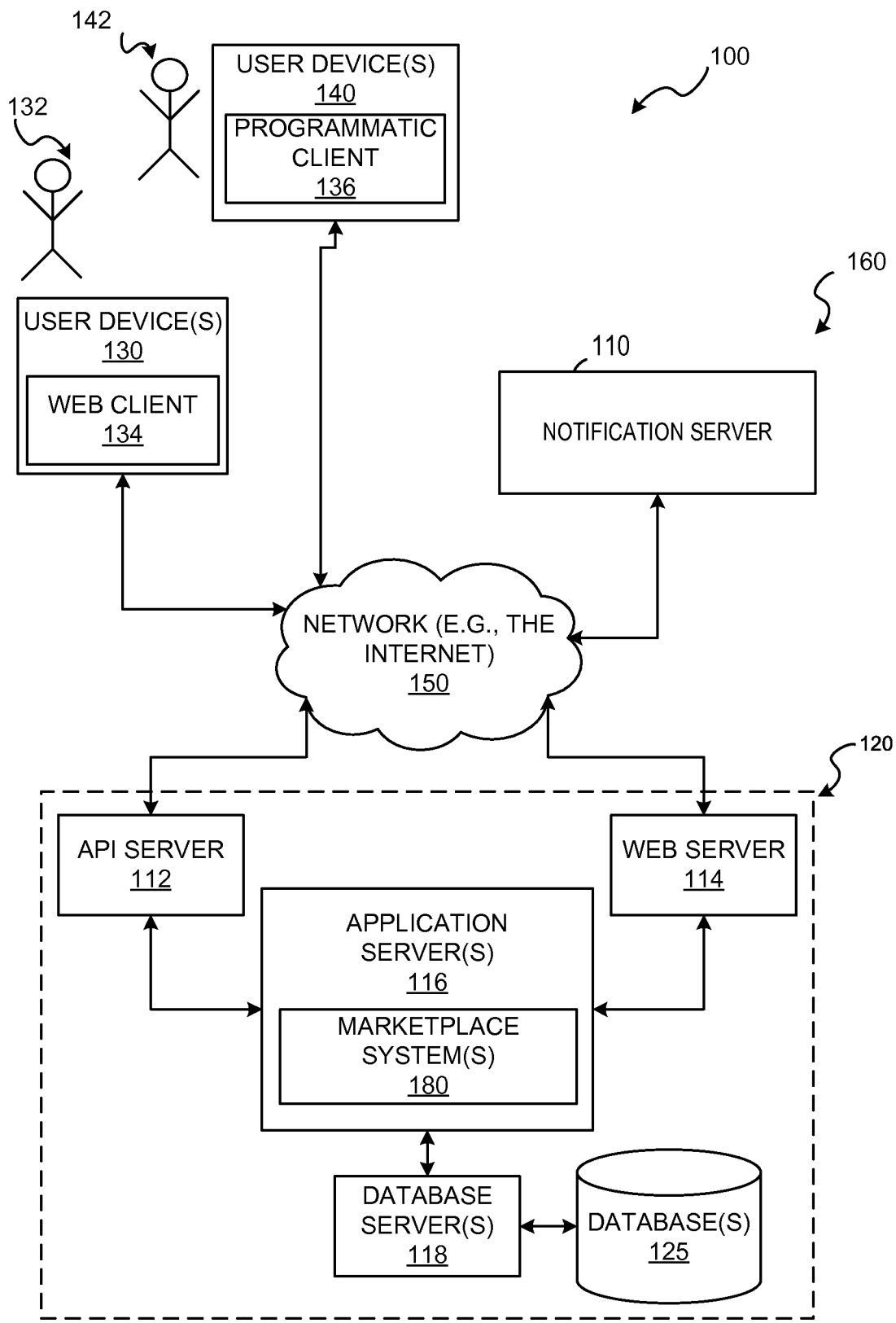
FIG. 1 is a network diagram illustrating a network environment suitable for matching buyers and sellers using calibrated user profiles and notification models, according to some example embodiments.

FIG. 1 is a network diagram illustrating a network environment 100 suitable matching buyers and sellers using calibrated user profiles and notification models, according to some example embodiments. The network environment 100 includes a server machine 110, a marketplace system 120, and devices 130 and 140, all communicatively coupled to each other via a network 150.

The server machine 110, explained in more detail with reference to FIG. 2, can form all or part of a network-based system 160 configured to match buyers and sellers using calibrated user profiles and notification models and generate the calibrated user profiles and notification models.

The marketplace 120 is shown as including an API server 112, a web server 114, an application server 116, a database server 118, and the database 125. In some embodiments, the marketplace 120 forms all or part of a network-based system 170 (e.g., a cloud-based server system configured to provide one or more services to the devices 130 and 140). The server machine 110, the marketplace 120, and the devices 130 and 140 may each be implemented in a computer system, in whole or in part, as described below with respect to FIG. 6.

The API server 112 provides a programmatic interface by which the device 130 and 140 can access the marketplace 120.

The application server 116 may be implemented as a single application server 116 or a plurality of application servers. The application server 116, as shown, hosts one or more marketplace system 180, which comprises one or more modules or applications and which may be embodied as hardware, software, firmware, or any combination thereof. The application server 116 is, in turn, shown to be coupled to the database server 118 that facilitates access to one or more information storage repositories or database(s), such as the database 125.

The marketplace system 180 provides a number of market place functions and services to users that interface with the network-based system 160. For example, the marketplace system(s) 180 can provide information for products for sale or at auction facilitated by the marketplace system(s) 180 and displayable in devices 130 and 140. In some embodiments, the marketplace 180 provides listings for products indicative of the information for products. The listings for products can be stored in the database 125 and may be searchable by through the network-based system 160. The listings may include information indicative of a product, a condition of the product, terms of sale for the product, shipping information, a description of the product, a quantity, metadata associated the product, metadata associated with coding for the listing, and information indicative of product organization, such as titles, categories, category taxonomies, and product interrelations. The marketplace system(s) 180 can also facilitate the purchase of products in the online marketplace that can later be delivered to buyers via shipping or any conventional method.

While the marketplace system 180 is shown in FIG. 1 to form a part of the network-based system 170, it will be appreciated that, in some embodiments, the marketplace system 180 may form part of a payment service that is separate and distinct from the network-based system 170. Further, while the client-server-based network environment 100 shown in FIG. 1 employs a user-server architecture, the present disclosure is not limited to such architecture, and may equally well find application in a distributed architecture system (e.g., peer-to-peer), for example. The various marketplace system(s) 180 may also be implemented as standalone software programs, which do not necessarily have networking capabilities.

While the marketplace system(s) 180 is shown in FIG. 1 to form part of the networked-based system 170, it will be appreciated that, in alternative embodiments, the marketplace system(s) 180 may form part of a payment service that is a part of the networked-based system 170.

The database server 118 is coupled to the database 125 and provides access to the database 125 for the device 130 and 140 and other aspects of the server machine 110. The database 125 can be a storage device that stores information related to products; documents; web sites; metadata relating to products, documents, or websites; and the like.

Also shown in FIG. 1 are users 132 and 142. One or both of the users 132 and 142 can be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and is a user of the device 130. For example, the device 130 can be a desktop computer, a vehicle computer, a tablet computer, a navigational device, a portable media device, a smartphone, or a wearable device (e.g., a smart watch or smart glasses) belonging to the user 132. Likewise, the user 142 is not part of the network environment 100, but is associated with the device 140. As an example, the device 140 can be a desktop computer, a vehicle computer, a tablet computer, a navigational device, a portable media device, a smartphone, or a wearable device (e.g., a smart watch or smart glasses) belonging to the user 142.

The device 130 and 140 contains a web client 134 which may access the various marketplace system(s) 180 and, in some cases, the server machine 110, via the web interface supported by the web server 114. Similarly, a programmatic client 136 is configured to access the various services and functions provided by the marketplace system(s) 180 and, in some cases, the server machine 110, via the programmatic interface provided by the API server 112. The programmatic client 136 may, for example, perform batch-mode communications between the programmatic client 136 and the networked-based system 160 and the server machine 110.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 150 may be any network that enables communication between or among machines, databases, and devices (e.g., the server machine 110 and the device 130). Accordingly, the network 150 can be a wired network, a wireless network (e.g., a mobile or cellular network), or any suitable combination thereof. The network 150 can include one or more portions that constitute a private network, a public network (e.g., the Internet), or any suitable combination thereof. Accordingly, the network 150 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 150 may communicate information via a transmission medium. As used herein, "transmission medium" refers to any intangible (e.g., transitory) medium that is capable of communicating (e.g., transmitting) instructions (e.g., processor executable instructions) for execution by a machine (e.g., by one or more processors of such a machine), and includes digital or analog communication signals or other intangible media to facilitate communication of such software.

Figure 2:
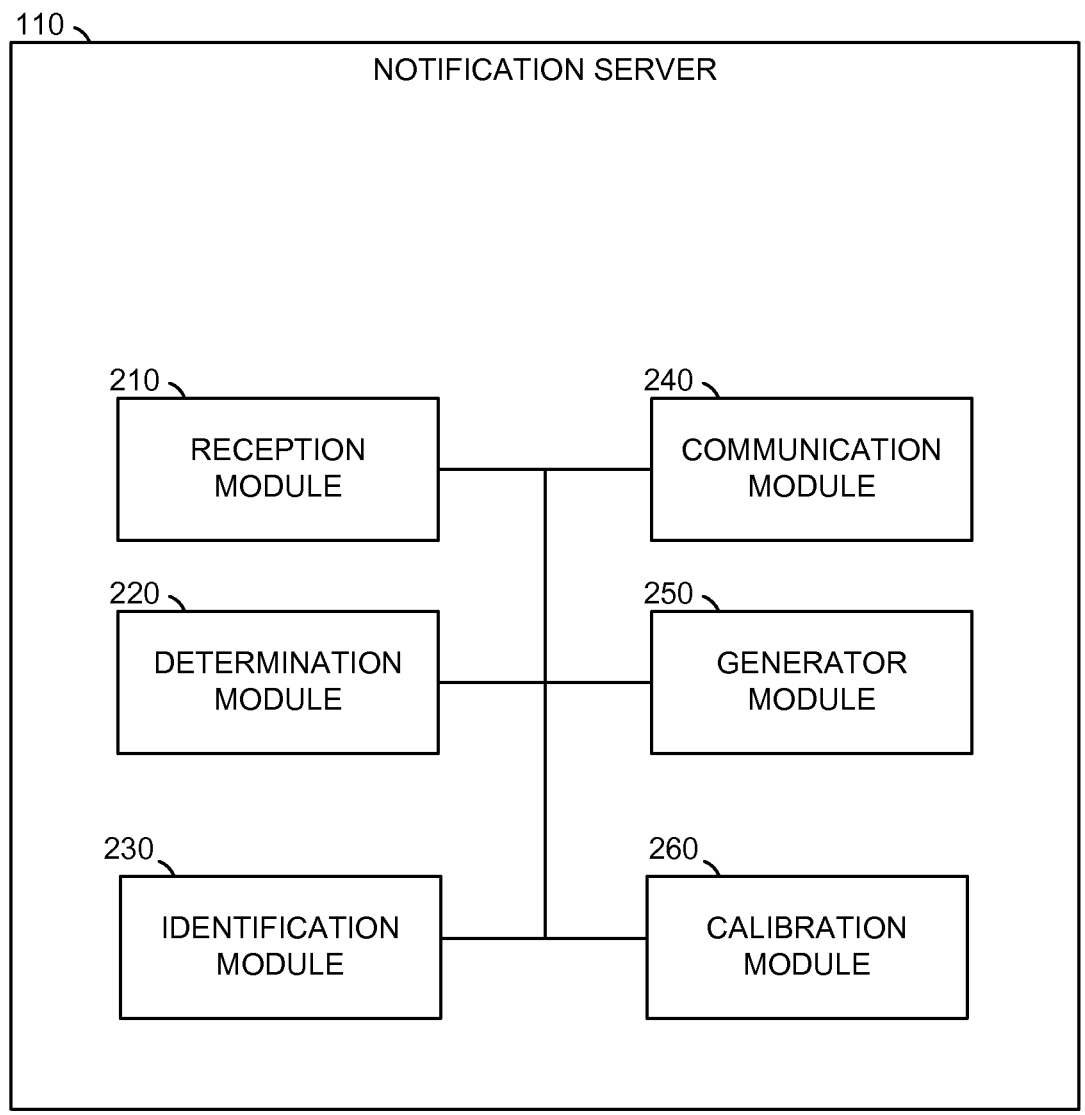
FIG. 2 is a block diagram illustrating components of a server machine suitable for generating calibrated user profiles and notification models, according to some example embodiments.

FIG. 2 is a block diagram illustrating components of the server machine 110, according to some example embodiments. The server machine 110 is shown as including a reception module 210, a determination module 220, an identification module 230, a communication module 240, a generator module 250, and a calibration module 260 all configured to communicate with each other (e.g., via a bus, shared memory, or a switch). Any one or more of the modules described herein may be implemented using hardware (e.g., at least one processor of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
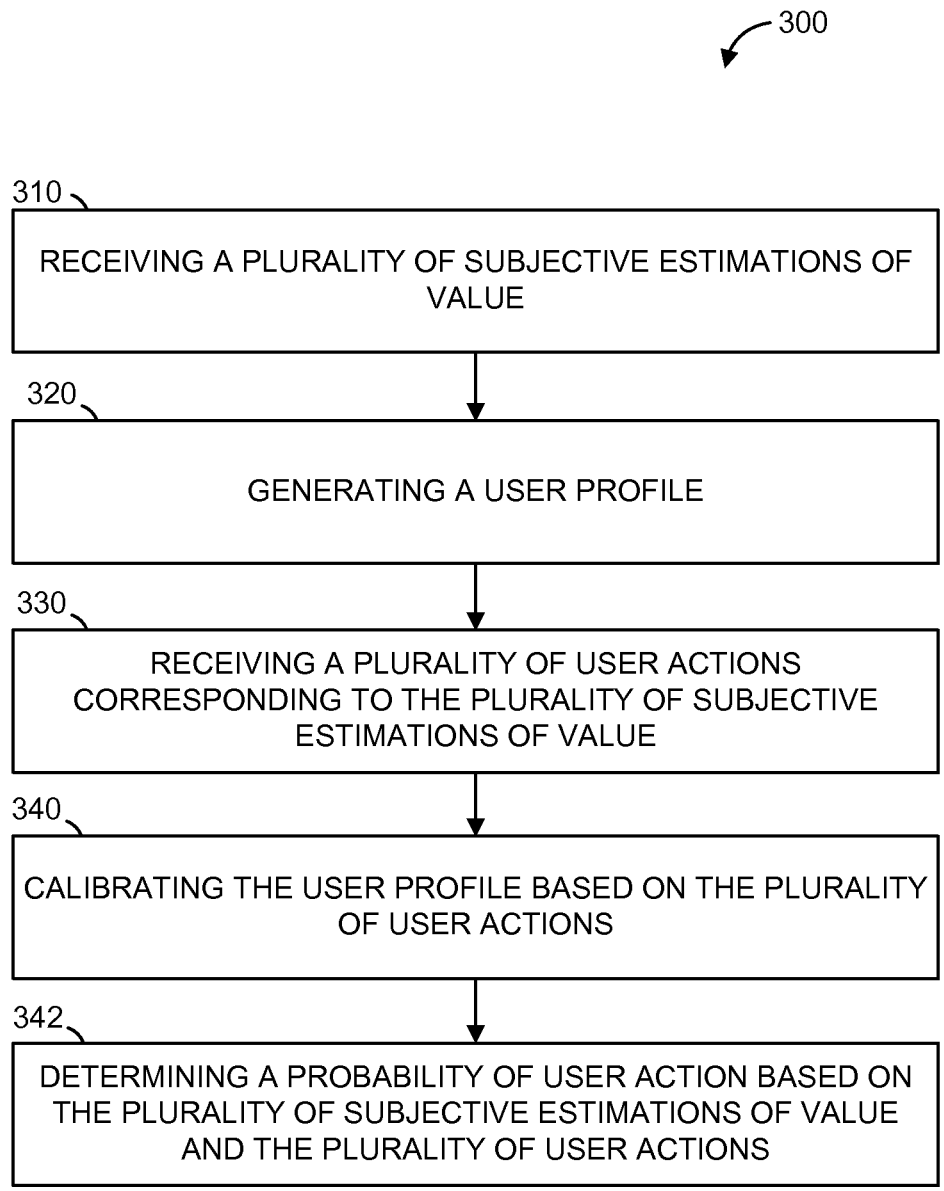
FIG. 3 is a flowchart illustrating operations of a device in performing a method of generating a calibrated user profile, according to some example embodiments.
Figure 4:
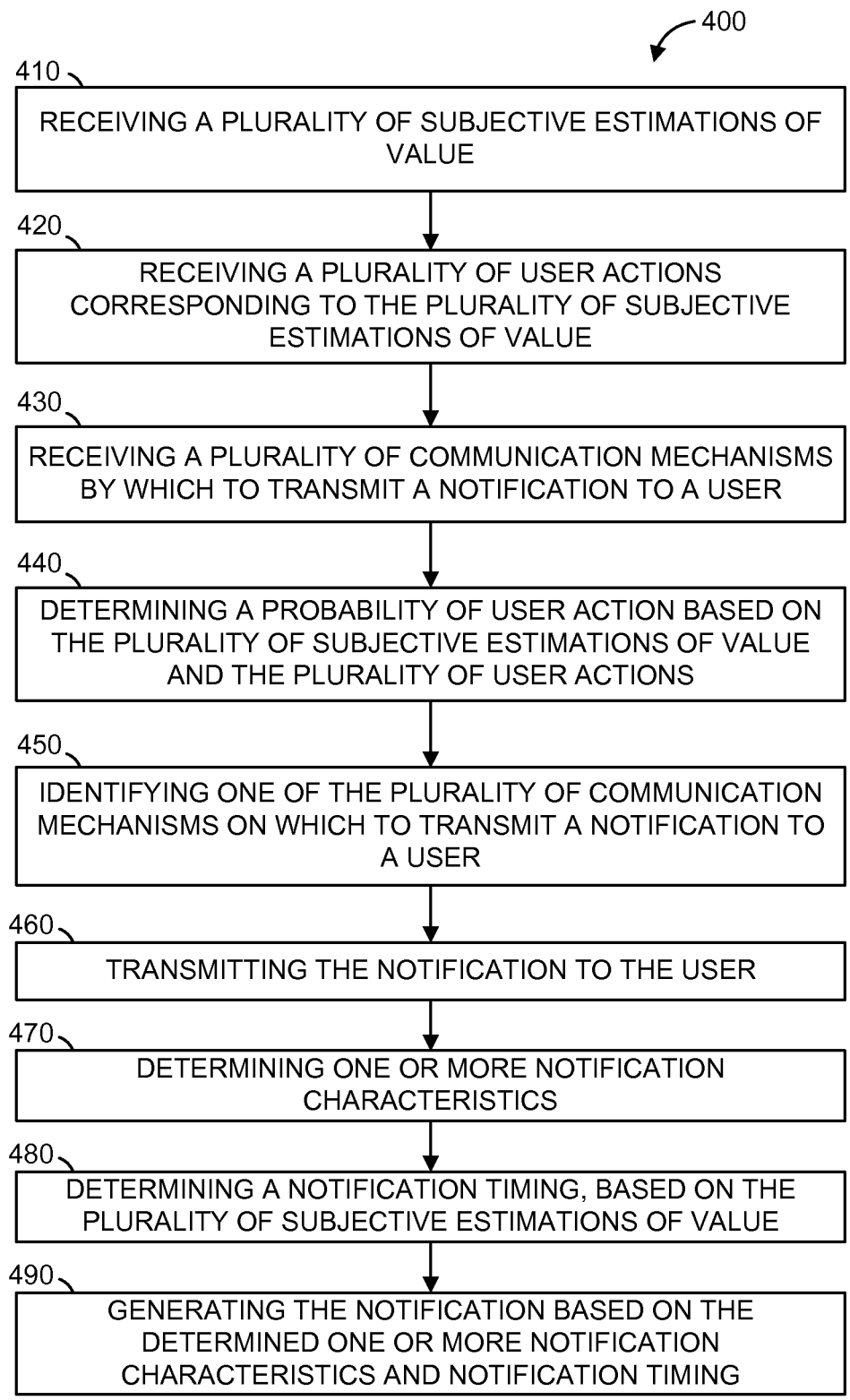
FIG. 4 is a flowchart illustrating operations of a device performing a method of generating a calibrated notification model, according to some example embodiments.
Figure 5:
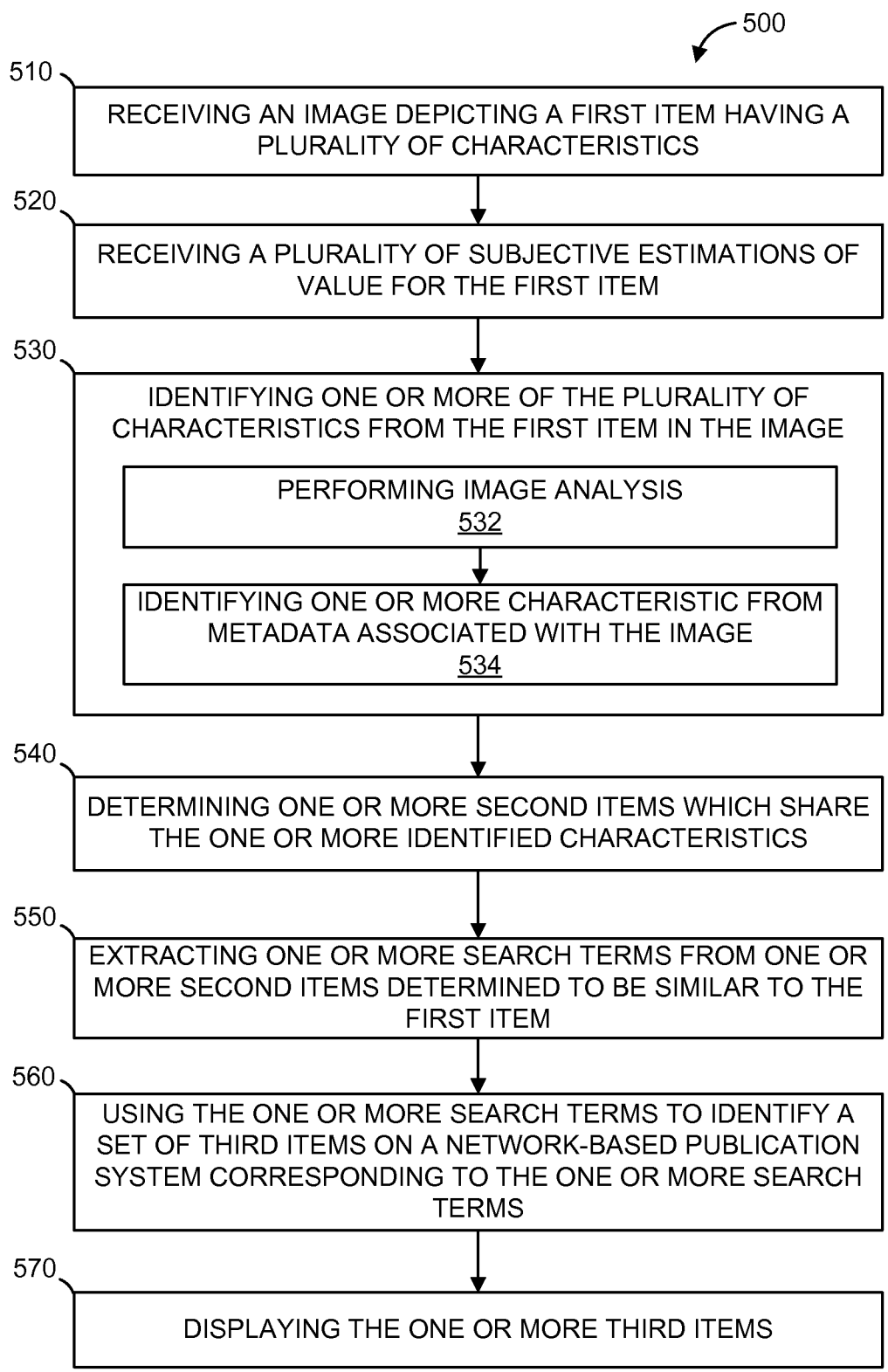
FIG. 5 is a flowchart illustrating operations of a device performing a method of matching buyers to sellers using the calibrated user profile and the calibrated notification model, according to some example embodiments.

FIG. 3-5 are flowcharts illustrating operations of the server machine 110 in performing a method 300 of generating a calibrated user profile, according to some example embodiments. Operations in the method 300 may be performed by the server machine 110, using modules described above with respect to FIG. 2.

In operation 310, the server machine 110 receives a plurality of subjective estimations of value. In some embodiments, the reception module 210 may receive the plurality of subjective estimations of value. The subjective estimations of value are a measure between a predetermined minimum value and a predetermined maximum value.

In some embodiments, the subjective estimation of value is implemented with discrete values between the predetermined minimum value and the predetermined maximum value. For example, where the user 132 is identifying the user's 132 need for an item in the marketplace 120, the user 132 may indicate a number between one and ten indicative of the user's 132 subjective need for the item, where one is the predetermined minimum value and ten is the predetermined maximum value. In this example, the discrete values for the subjective estimation of value may be indicated by whole numbers between one and ten.

In some embodiments, the subjective estimation of value is implemented as a continuous measure between the predetermined minimum value and the predetermined maximum value. For example, the subjective estimation of value may be implemented in a graphical user interface on the device 130 as a slider extending between the predetermined minimum value and the predetermined maximum value. The each slider presented within the graphical user interface is a graphical representation of a specified subjective estimation of value. For instance, where the user 132 is identifying the user's 132 need for an item, the user 132 may place the slider at any position between one and ten as indication of the user's 132 subjective need for the item, where one is the predetermined minimum value and ten is the predetermined maximum.

In operation 320, the server machine 110 generates a user profile. In some embodiments, the server machine 110 may import the plurality of subjective estimations of value into the profile to determine one or more attributes of the user 132 based on the plurality of subjective estimations of value. In some embodiments, in generating the user profile, the server machine 110 may receive data from the user indicative of demographic, location, and preference data from the user. Further, in some embodiments, the server machine 110 may receive data indicative of interests, desires, financial information, payment information, and other distinguishing data for the user.

The server machine 110 may import the plurality of subjective estimations of value in relation to a specific item, product, or image. Given a plurality of sets of subjective estimations of value on related items, products, images, or the like, the server machine 110 determines one or more of the plurality of subjective estimations of value which relate to a category into which one or more of the specific item, product, or image may be organized. Where the server machine 110 determines a category corresponding to a set of subjective estimations of value, the server machine 110 identifies an association between the category and the set of subjective estimations of value.

In operation 330, the server machine 110 receives a plurality of user actions corresponding to the plurality of subjective estimations of value. The server machine 110 may receive the plurality of user actions and perform one or more identification processes on the plurality of user actions. For example, the server machine 110 may determine a specific item, product, or image corresponding to one or more of the plurality of user actions. Where the server machine 110 receives a set of user actions corresponding to a plurality of items, products, or images which may be categorized, the server machine 110 may create an association between the set of user actions and a category encompassing the plurality of items, products, or images.

In operation 340, the server machine 110 calibrates the user profile based on the plurality of user actions. The server machine 110 can determine that a subjective estimation of value corresponds to a user action for a specific item, product, image, or category thereof. Where the server machine 110 determines such a correspondence, the server machine 110 applies or adjusts a weighted value to the subjective estimation of value indicative of a higher likelihood of user action in relation to a future association of the subjective estimation of value with an item, product, image, or category thereof similar to that for which the subjective estimation of value was initially received. Further, where the server machine 110 determines such a correspondence, the category relating to the item, product, image, or category thereof associated with the subjective estimation of value and the user action may receive a weighted value or an adjustment to an associated weighted value indicative of a higher likelihood of user action with regard to items, products, or images associated with the category.

In some embodiments, in performing the operation 340, the server machine 110 may also perform operation 342. In operation 342, the server machine 110 determines a probability of user action based on the plurality of subjective estimations of value and the plurality of user actions. In these embodiments, the server machine 110 may determine the probability of user action based on a combination of the item, product, image, or category thereof and the correspondence of the subjective estimation of value and the prior user action.

FIG. 4 is a flowchart illustrating operations of the device 130 in performing a method 400 of generating and transmitting notifications calibrated to a user, according to some example embodiment. Operations in the method 400 may be performed by the device 130, using modules described above with respect to FIG. 2.

In operation 410, the server machine 110 receives a plurality of subjective estimations of value. The subjective estimations of value being a measure between a predetermined minimum value and a predetermined maximum value.

In operation 420, the server machine 110 receives a plurality of user actions corresponding to the plurality of subjective estimations of value. In some embodiments, the plurality of user actions may be a plurality of first user actions and the server machine 110 may receive a plurality of second user actions corresponding to a plurality of notifications.

In operation 430, the server machine 110 receives a plurality of communication mechanisms by which to transmit a notification to a user. The plurality of communication mechanisms can include SMS notifications, emails, text messages, IM notifications, calendar reminders, social media posts, social media notifications, or the like. The plurality of communication mechanisms may be received from the user 132, the user profile, or, in some embodiments, interactions on the graphical user interface between the user 132 and the marketplace 120.

In operation 440, the server machine 110 determines a probability of user action based on the plurality of subjective estimations of value and the plurality of user actions. As discussed above, the server machine 110 may determine the probability of user action based on correspondence of previous user actions and subjective estimations of value, as well as items, products, images or categories thereof associated with such correspondences.

In operation 450, the server machine 110 identifies one of the plurality of communication mechanisms on which to transmit a notification to a user, based on the plurality of subjective estimations of value, the plurality of user actions, the probability of user action, and the like. In some embodiments, the server machine 110 may identify one or more of the plurality of communication mechanisms on which to transmit a notification. The server machine 110, based on a level of urgency indicated by the subjective estimations of value, determines that a notification or versions of a notification should be transmitted across all channels in a highly interruptive manner such that the user's 132 attention is directed to the notification based on the content of the notification, the style or characteristics of the notification, the number of transmissions of the notification, or the like. In some embodiments, the server machine 110 generates a notification model, based on the subjective estimations of value, the plurality of user actions, the probability of user action, or the like to pair two or more notification mechanisms together for transmission of a notification. The server machine 110 determines the two communication mechanisms may cooperate to increase notification efficacy while maintaining a desired level of urgency, unobtrusiveness, style, or the like of the notification.

In operation 460, the server machine 110 transmits the notification to the user.

In some embodiments, the method 400 further includes operations 470, 480, and 490. In operation 470, the server machine 110 determines one or more notification characteristics based on the plurality of subjective estimations of value; at least one of the plurality of first user actions and the plurality of second user actions; and the probability of user action. For example, the notification characteristics can include the content of the notification, a message type, an urgency value, an importance value, a need value, a desire value, a probability of user action value, and other notification characteristics. In some embodiments, a notification may have a repetition value in which the notification is determined to be a serial notification with a delivery having a predetermined time interval and a predetermined communication mechanism.

In operation 480, the server machine 110 determines a notification timing, based on the plurality of subjective estimations of value; at least one of the plurality of first user actions and the plurality of second user actions; and the probability of user action. For example, the server machine 110 may match the content of the notification, the urgency value, and the importance value with one or more of the subjective estimations of value, at least one of the plurality of user actions, and the probability of user action to determine a priority indicating that the notification should be transmitted immediately. Further the server machine 110, can determine, using the repetition value, the urgency value, and the content of the notification, that a notification should be transmitted on a weekly basis, each time updating the content of the notification, between the hours of 7:00 p.m. and 8:00 p.m. In this example, the server machine 110 may determine that the user 132 visits the marketplace 120 website between the hours of 7:00 p.m. and 8:00 p.m. on Wednesday night and that timing the notification to coincide with the website visit may increase the probability of future user action by the user 132.

In operation 490, the server machine 110 generates the notification based on the determined one or more notification characteristics and the determined notification timing.

FIG. 5 is a flowchart illustrating operation of the device 130 in performing a method 500 of matching a set of items from the marketplace 120 to an item from an image based on a plurality of subjective estimations of value indicated by the user 132. Operations in the method 500 may be performed by the device 130, using modules described above with respect to FIG. 2. As shown in FIG. 5, the method 500 includes operations 510, 520, 530, 540, 550, 560, and 570. In some embodiments, the method 500 may include operation 580.

Figure 6:
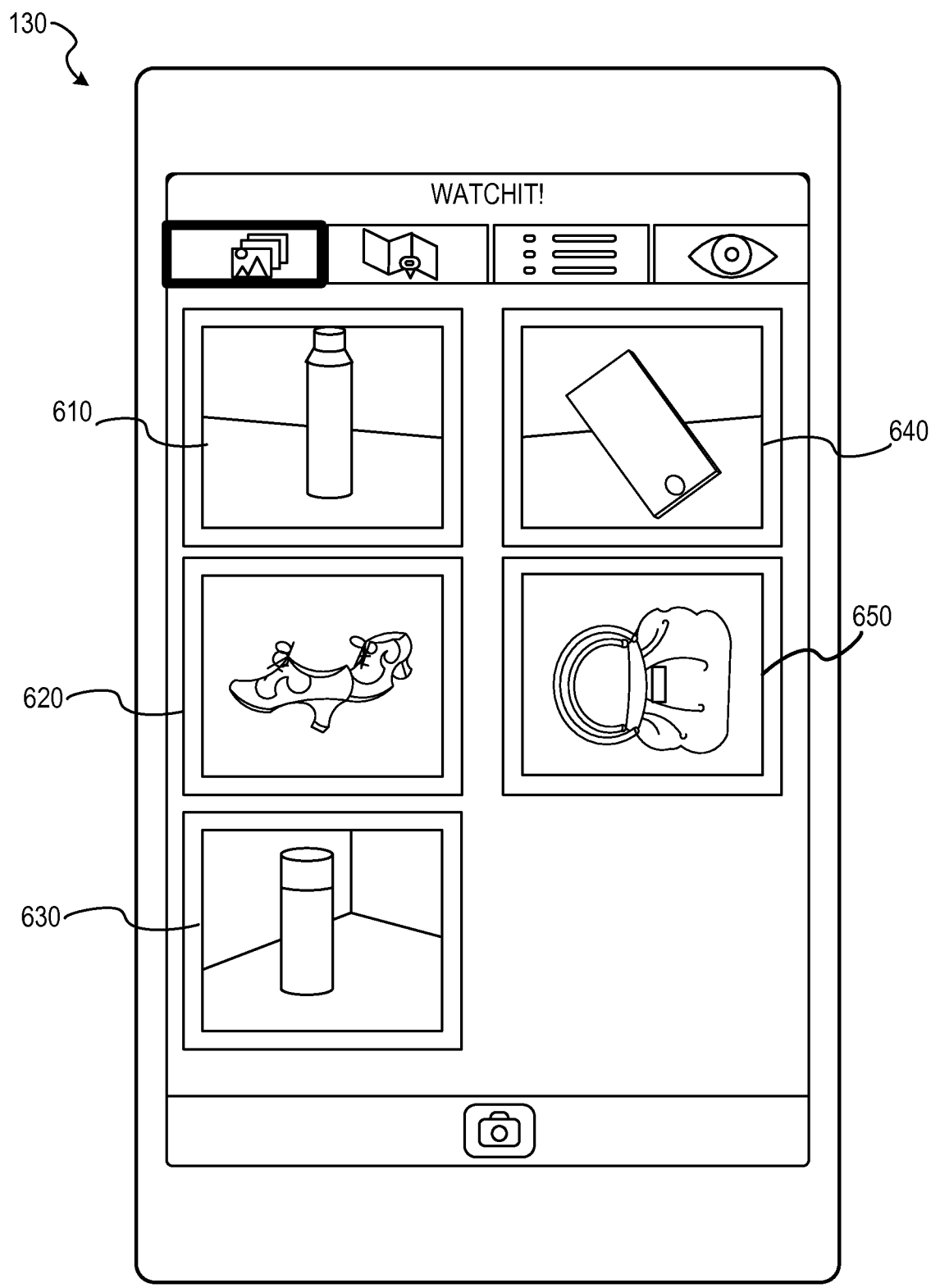
FIG. 6 is an illustration of an example graphical user interface of a client device, according to some example embodiments.

In operation 510, the server machine 110 receives an image depicting a first item having a plurality of characteristics. As shown in FIG. 6, people may take pictures 610-640 of items they like, desire, need, suggest to others, or the like. Pictures or photographs may have a single item or multiple items. In some instances, where a photograph has multiple items, the user 132 may only be interested in a single item in the photograph.

Figure 7:
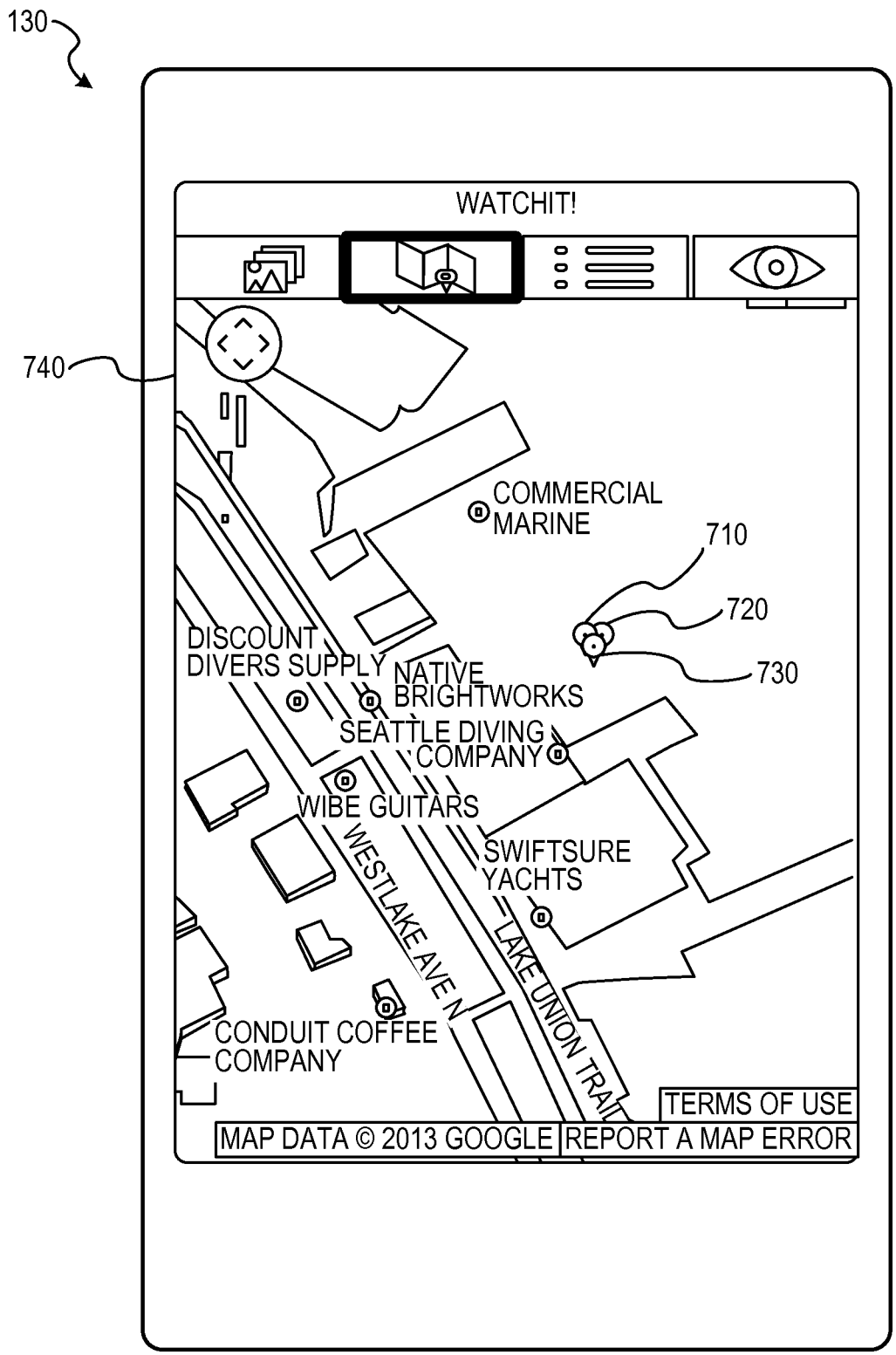
FIG. 7 is an illustration of an example graphical user interface of a client device, according to some example embodiments.

As shown in FIG. 7, images, taken by the user 132, may contain metadata, such as geographic location, source, tags, or the like. Metadata corresponding to, relating to, or identifying an image may be generated automatically, at the same time as the photograph, or may be generated, embedded, attributed, or otherwise added later. For example, the user 132 may take photographs on the device 130, such as a mobile telephone. The device 130, or a software application installed on or native to the device 130, may append a geographic location to the image as metadata. The user 132 may add metadata, such as a name of the item shown in the photograph, a description of the item, an indication of desire for the item, an indication of need for the item, an indication of attribution of ownership of the item or photograph, or the like.

Figure 8:
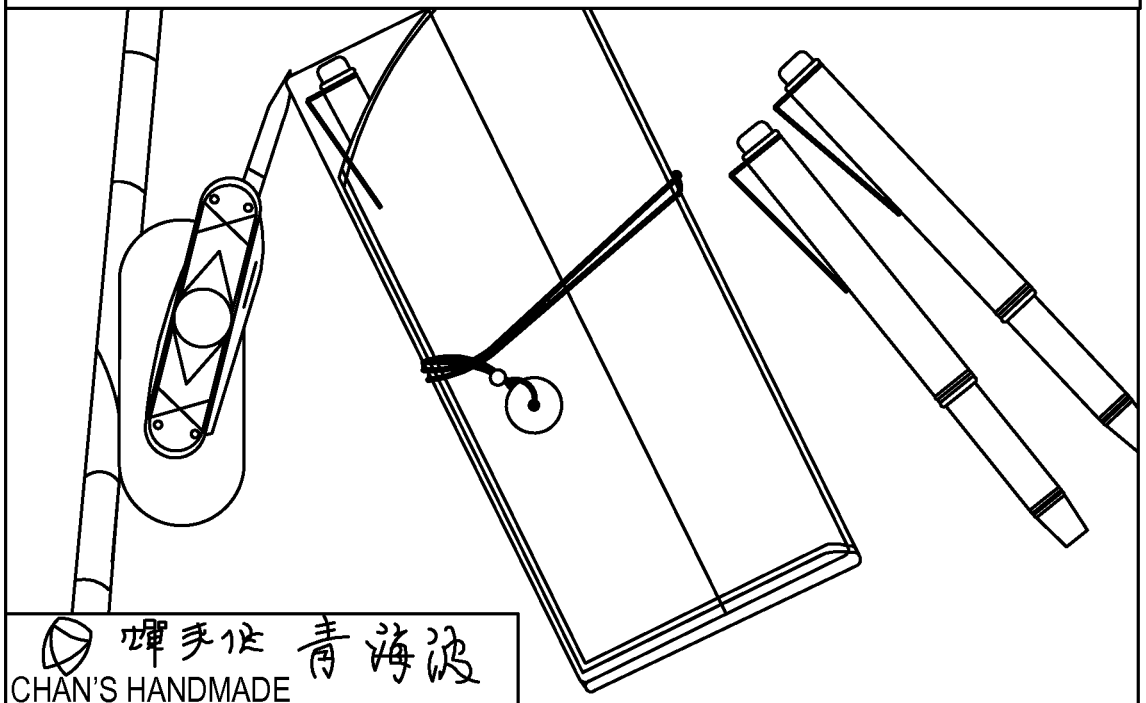
FIG. 8 is an illustration of an example graphical user interface of a client device, according to some example embodiments.

In regards to metadata, in some embodiments relating to the marketplace 120, the user 132 or the server machine 110 may include metadata with the photograph (e.g., as shown in FIG. 8), such as potential sellers in the marketplace 120 who currently offer an item matching or similar to the item depicted in the photograph, potential buyers who have indicated a desire for the item (e.g., through an indication in the plurality of subjective estimations of value), buyers who have recently purchased an item matching or similar to the item depicted from a seller on the marketplace 120, or the like. Further, the user 132 or the server machine 110 may add metadata such as item details, description of an item in the photograph, an indication of other user actions with regards to the photograph, and the like. For example, other user actions appended to the image as metadata may include users who indicated an interest in or desire for the item pictured, users who shared the photograph, or users who commented on the photograph.

Figure 9:
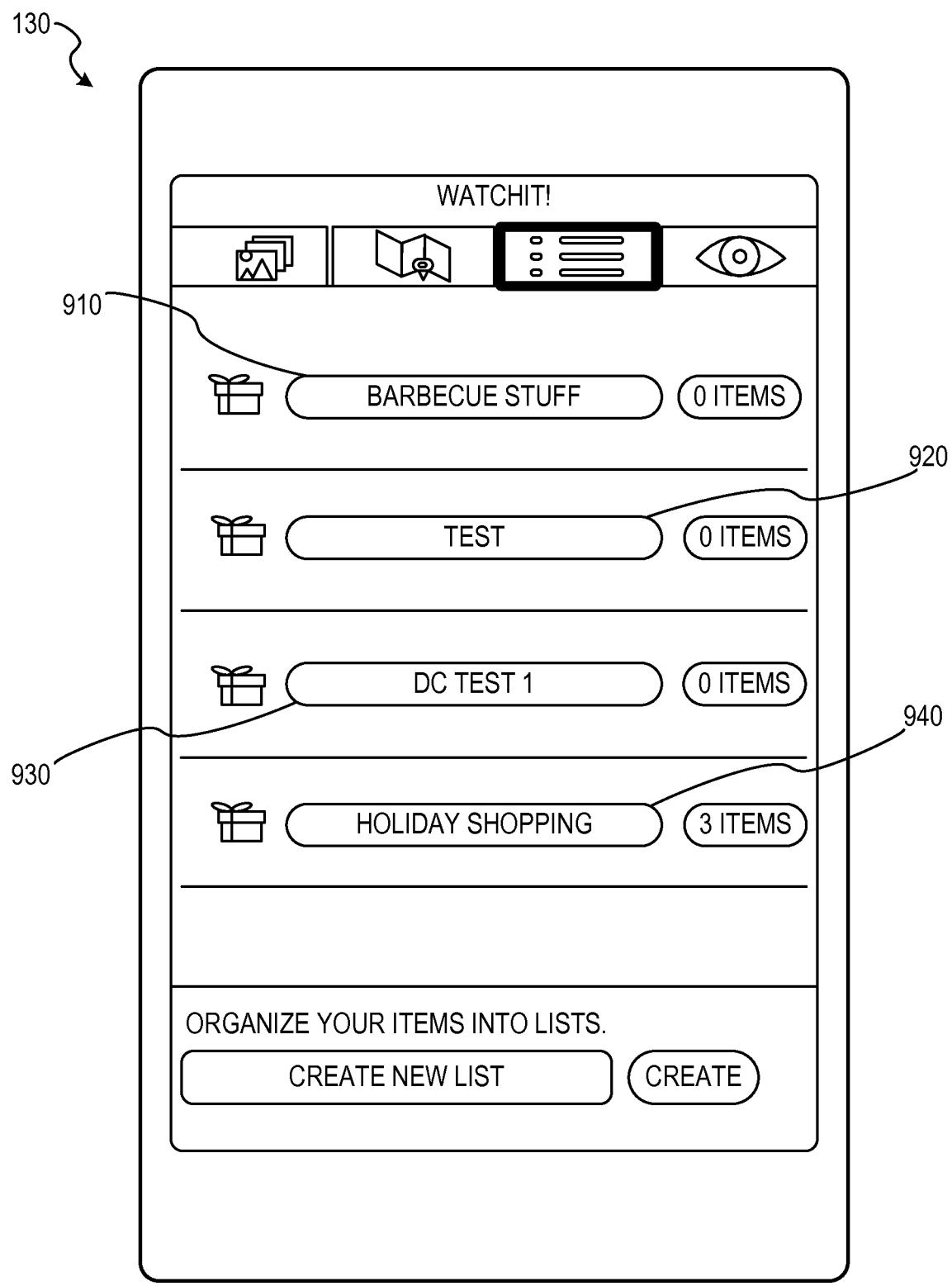
FIG. 9 is an illustration of an example graphical user interface of a client device, according to some example embodiments.
Figure 10:
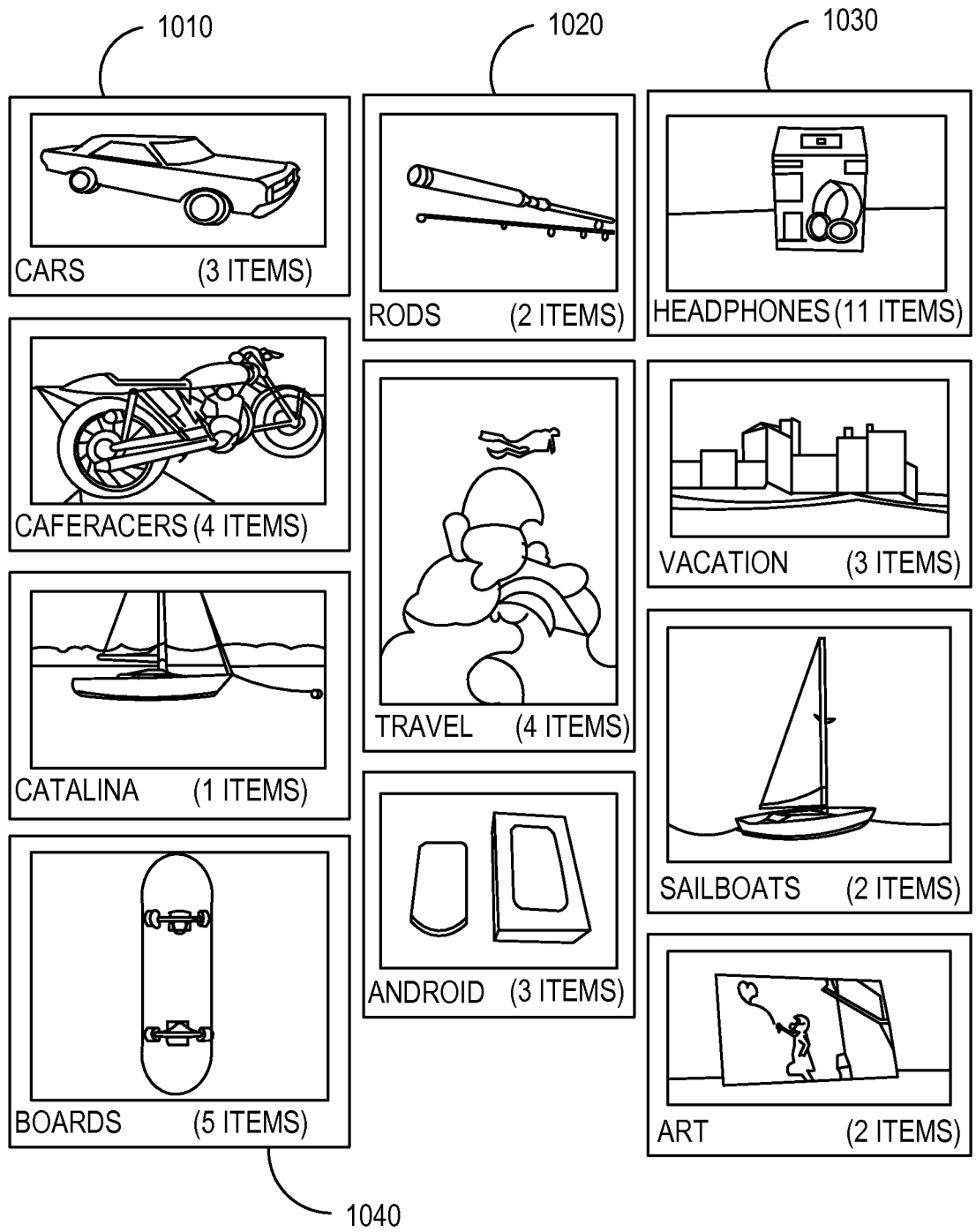
FIG. 10 is an illustration of an example graphical user interface of a client device, according to some example embodiments.

As shown in FIGS. 9 and 10, the user 132 may organize photographs into categories or may organize the items contained within the photographs into categories. The user 132 may place photographs into folders, such as virtual folders in an operating system, database, or other application configured to organize electronic data based on user input. The user 132 may organize the photographs, images, or other digital representations into folders by semantic categories, image similarity, or the like. As shown in FIG. 9, the user 132 may manually organize or curate lists 910-940 of photographs or items within photographs. As shown in FIG. 10, the images may be organized into categories including a representational image.

The user 132 may manually organize or curate lists of photographs or items within photographs. Lists may be anything the user 132 collects together, such as a wedding registry, items for a camping trip, items for a new baby, a collection of photographs generally related to a theme, or the like, for example. The user 132 may maintain the list as a private list, accessible only by the user 132 and/or persons linked to the user 132 in the server machine 110 or in other social media systems. The user 132 may maintain the list as a public list and/or shared list with selected other people or the general public to facilitate organizing the items in which the user 132 or a group of users is interested. For example, the user 132 may employ public or shared lists to enable a social shopping experience between the group of users.

Where users employ public lists, the group of users may comment on photographs or items within the list; indicate interest in or desire for the item or photograph, such as by sharing the item with other users, indicating that the photograph or item is a favorite of the user through a binary selection, or indicate one or more of the plurality of subjective estimations of value.

Referring again to FIG. 5, in operation 520, the server machine 110 receives a plurality of subjective estimations of value for the first item. The subjective estimations of value are a measure between a predetermined minimum value and a predetermined maximum value. As described above, in some embodiments, the subjective estimations of value may be implemented with discrete values between the predetermined minimum value and the predetermined maximum value, or as a continuous measure between the predetermined minimum value and the predetermined maximum value.

Figure 11:
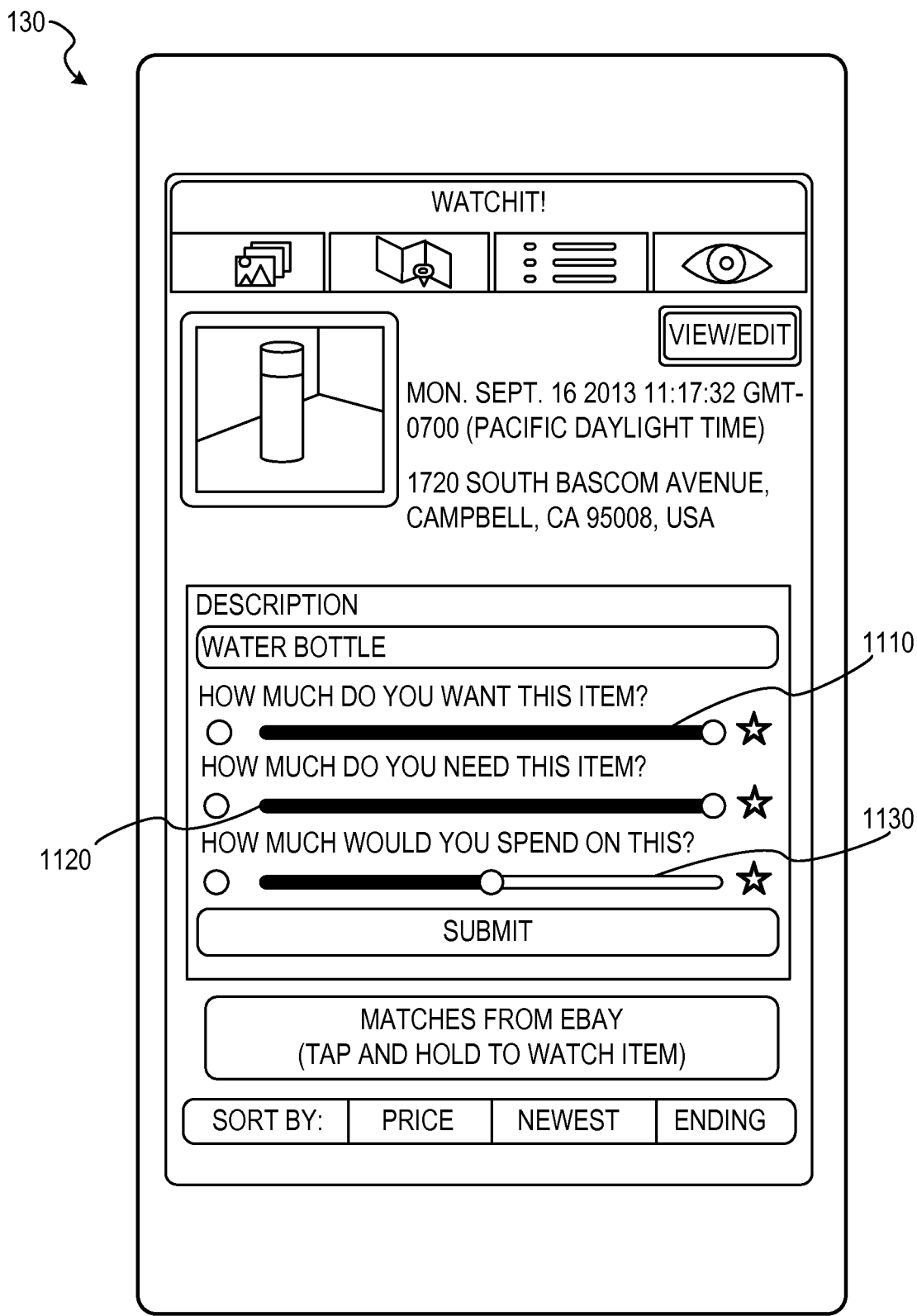
FIG. 11 is an illustration of an example graphical user interface of a client device, according to some example embodiments.
Figure 12:
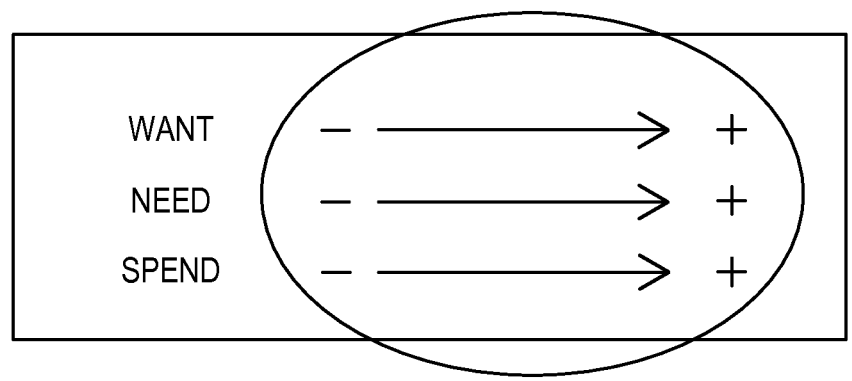
FIG. 12 is a representation of sliders allowing users to specify qualitative levels of desire.

As shown in FIGS. 11 and 12, by way of example, the plurality of subjective estimations of value, also referred to in FIG. 12 as qualitative levels of desire, may be implemented as a plurality of sliders 1110-1130. The user 132 may adjust each of the plurality of sliders 1110-1130 to indicate the importance of an item, a subjective desire to own the item, and an amount the user 132 is willing to spend, for example, based on the position of the slider indicating a value. In some embodiments, the user 132 may indicate a desired time frame for purchase, a likelihood of purchase, a likelihood of repurchasing the item, a time frame for repurchase of items, or other subjective estimations of value. When implemented as sliders, the user 132 may adjust the plurality of subjective estimations of value on predefined axes of the slider, whether vertical, horizontal, circular, or the like. As shown in FIG. 11, in some embodiments, when implemented as sliders, the plurality of subjective estimations may be a continuous measure between the predetermined minimum value and the predetermined maximum value.

Where implemented as sliders, the sliders 1110-1130 may enable the user 132 to indicate to the server machine 110 a qualitative level of desire, interest, need, or the like indicative of the plurality of subjective estimations of value. This may enable the user 132 to clarify nuances behind the items of interest. These nuances may increase the granularity with which the server machine 110, in cooperation with the marketplace 120, may predict future interactions, the urgency of those interactions, and ultimately the likelihood that those interactions will lead to a purchase.

The plurality of subjective estimations of value may provide an additional metric, means, or categorization by which to organize items and categories of items that interest the user 132 by the qualitative desire and urgency within those categories. The plurality of subjective estimations of value may also enable sellers, in the marketplace 120 or other systems or retail environments, to identify buyers, given the buyers' self-identified and machine derived interactions with the server machine 110. As an example of machine derived interactions, the server machine 110 may generate models of user behavior by a combination of user actions within the server machine 110 and information provided by the user 132.

One such model may be a system action model, allowing interactions with users to be driven by a more personalized or granular understanding of the user's needs and interests. For instance, if the user 132 ranks an item or categories of items highly on the plurality of subjective estimations of value, more direct email or push notifications may be appreciated and may be generated and transmitted by the server machine 110. For items or categories the user 132 ranks low on the plurality of subjective estimations of value, the server machine 110 may determine that email or push notifications may be unwanted by the user 132 with regard to that item or category of items. In some embodiments, where the user 132 indicates a high estimation of value and willingness to spend a larger amount of money but a low need, as indicated by the plurality of subjective estimations of value, the server machine 110 may interpret the plurality of subjective estimations of value to indicate an interest in niche items or hedonistic spending which could inform or trigger different notifications for the user 132 or certain items or categories of items for the user 132.

In some embodiments, the plurality of subjective estimations of value may enable the server machine 110 to segment or prioritize items or categories of items for personal evaluation, management, and disposition to known and potential recipients and services. In some embodiments, the server machine 110 may enable automated actions to be set based on the plurality of subjective estimations of value. For example, the server machine 110 may enable the user 132 to authorize the server machine 110 to place bids or purchases in a marketplace 120 based on the plurality of subjective estimations of value, such as a relatively high indication of want or need.

Figure 13:
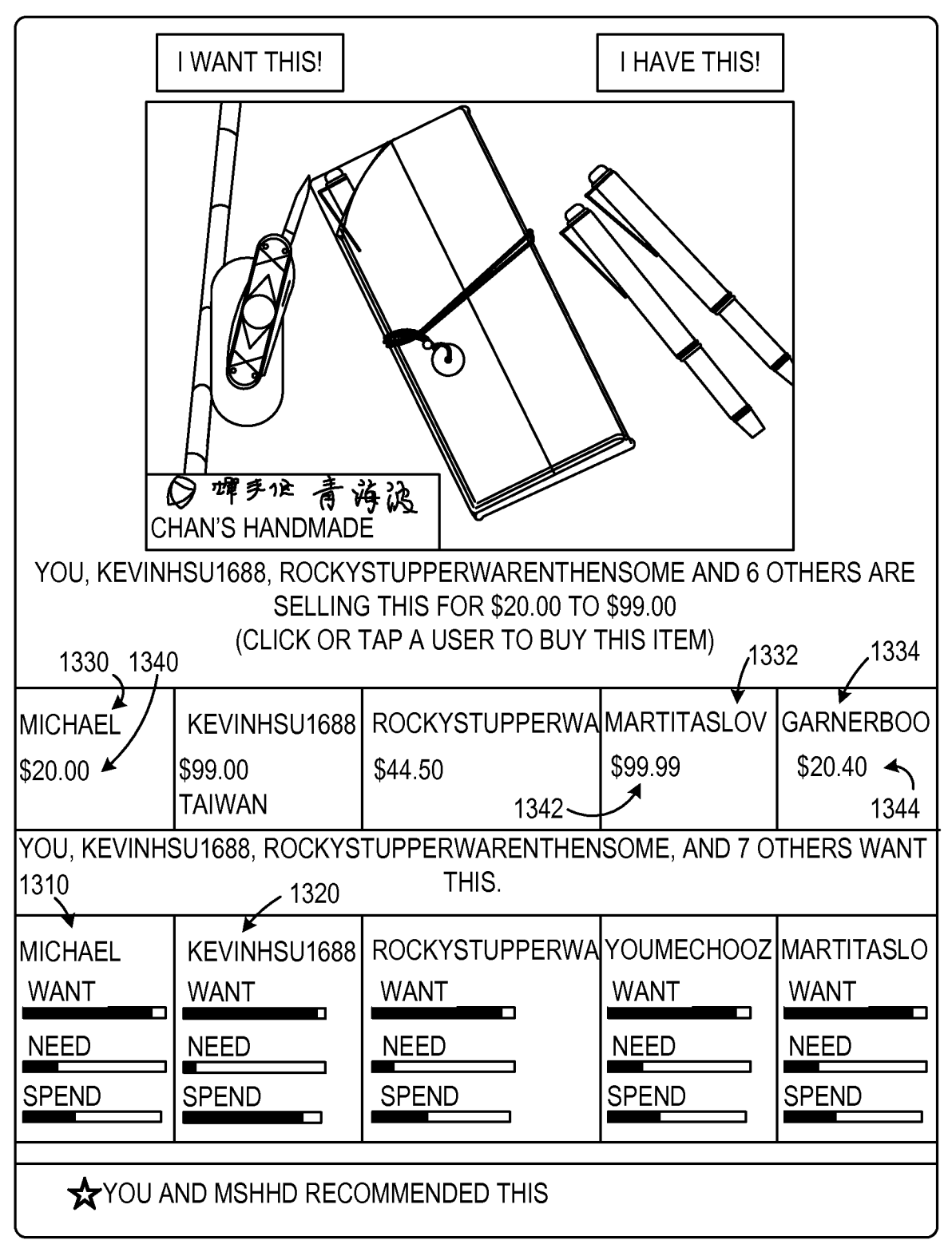

In some embodiments, the user 132 may additionally indicate desire, interest, or ownership on the photograph of another user 1310 and 1320, as shown in FIG. 13.

In some embodiments cooperating with the marketplace 120, as shown above in FIG. 13, the user 132 may select or otherwise indicate a desire, interest, or want for an item, or that the user 132 owns the product. The server machine 110 may include metadata with the photograph, which may be an image or other digital representation, and display to users of the server machine 110 information indicative of users that currently have the item, and may include the price that the user paid. In some embodiments, the server machine 110 may indicate sellers 1330-1334 on the marketplace 120 who have the item, the price 1340-1344 of the item listed with the seller, and the location for each potential seller of the item. In some embodiments, the server machine 110 may include in the metadata and display to users of the server machine 110 details of users who have indicated an interest in or desire for the item depicted in the image. For example, the server machine 110 may display the plurality of subjective estimations of value indicated by the users who expressed interest in the item, such as how much the users wanted the item, needed the item, or were willing to spend on the item.

In some embodiments, as shown in FIG. 14, the server machine 110 may also include information indicative of users who showed interest in the item, (e.g., interested parties 1410), such as those users who favorited the item, shared the image, and the like. The server machine 110 may also indicate any public lists in which the image or item may be included and any comments on the item or image (e.g., reviewing users 1420 and 1430).

Referring again to FIG. 5, in operation 530, the server machine 110 identifies one or more of the plurality of characteristics from the first item in the image. The server machine 110 may identify characteristics from metadata associated with the image, the image analysis of the image containing the first item, images similar to the image containing the first item. The plurality of characteristics may be indicative of an item type, an item category, an item brand, an item model, a color, a shape, a price, an item description, or the like.

In some embodiments, in conjunction with the operation 530, the server machine 110 may initiate operation 532, in which the server machine 110 performs image analysis of the image. In operation 534, the server machine 110 identifies one or more characteristic from metadata associated with the image. The metadata may be entered by the user 132, associated with the image from a third party, associated with the image by the image owner, or otherwise associated with the image.

In operation 540, the server machine 110 determines one or more second items which share the one or more characteristics identified in the operation 530. The server machine 110 may determine one or more second items by image analysis of separate images, identifying the one or more characteristics of the first image through image analysis or metadata associated with the one or more second items in one or more second images.

In operation 550, the server machine 110 extracts one or more search terms from one or more second items determined to be similar to the first item. For example, the server machine 110 may extract one or more term in metadata for the images associated with the one or more second items.

In operation 560, the server machine 110 uses the one or more search terms to identify a set of third items on a marketplace 120 corresponding to the one or more search terms.

Figure 15:
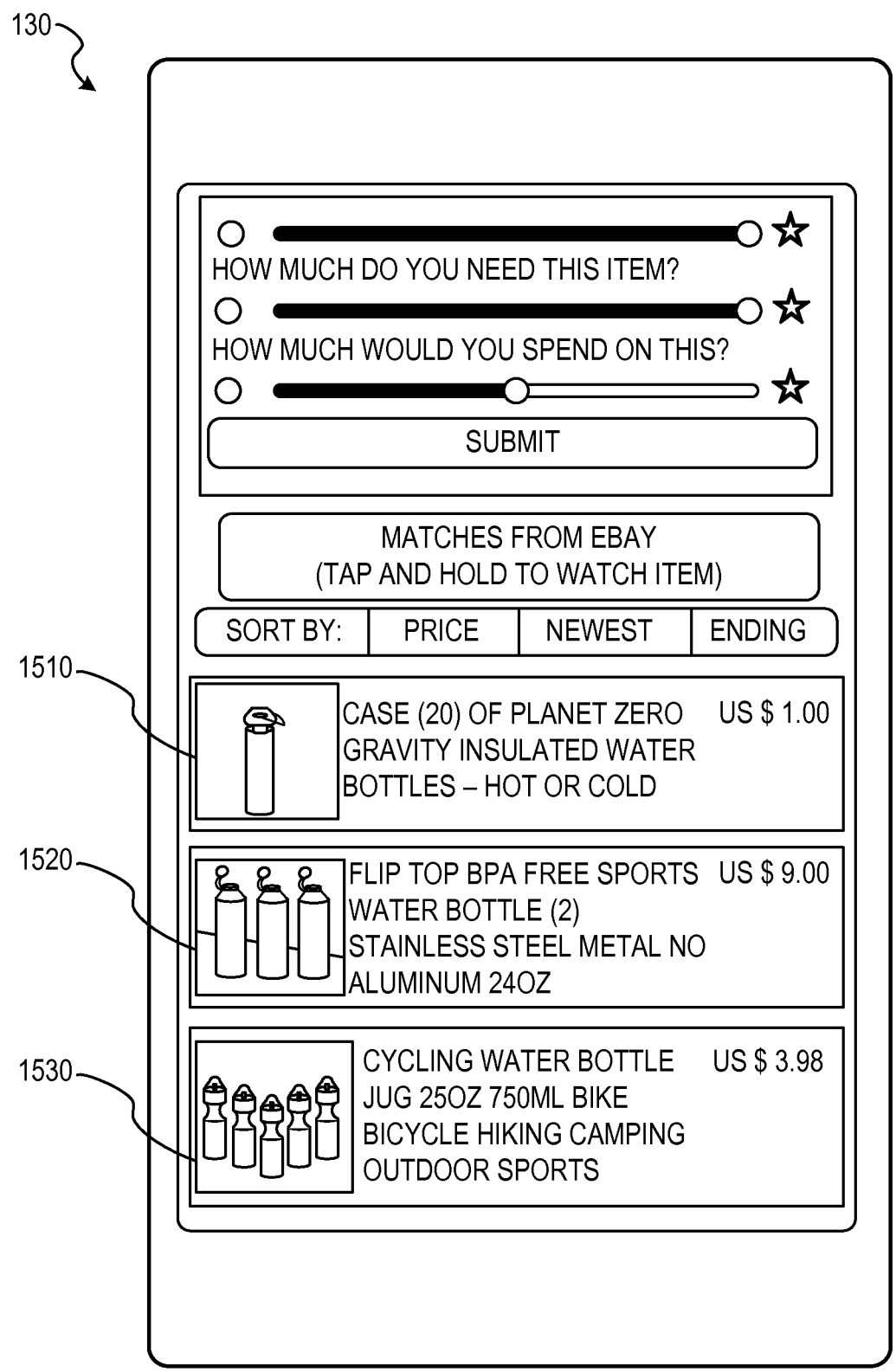
FIG. 15 is an illustration of an example graphical user interface of a client device, according to some example embodiments.

As shown in FIG. 15, the server machine 110 may perform image processing on the image to determine similar items 1510-1530. Where the image has no associated identifying information, metadata, the server machine 110 may perform image processing to relate or associate the item in the image with one or more item contained in an image having associated identifying information. The server machine 110 may then extract relevant search terms from similar items that have metadata (e.g., tags associated with them) and issue a query to a marketplace 120, such as eBay.

In some embodiments, the server machine 110 may identify the set of third items by determining the plurality of subjective estimations of value entered by the user 132 for the first item, determining an item category for the first item, and matching the plurality of subjective estimations of value entered by the user 132 to items offered by a seller on the marketplace 120. In matching the first item to items offered by the seller, the server machine 110 may determine an associative array of items about which to notify the seller, an associative array of items about which to notify the user 132, a potential buyer, and a distance threshold. In some embodiments, the distance threshold may be a value used for weighting item matches for determining items about which the user 132 or the seller should be notified. The server machine 110 may determine a score for each of the plurality of subjective estimations of value, determine differences between the first item and the item for sale, determine a distance between the scores of the plurality of subjective estimations of value between the first item and the item for sale, determine a distance between the category of the first item and the item for sale, and determine a total distance, based on the above-referenced scores, between the first item and the item for sale. In some embodiments, the server machine 110 may use the value for the total distance, compare the total distance value to the distance threshold, and determine whether to transmit a notification about the item for sale. For example, the server machine 110 may determine whether the total distance is below the distance threshold and, if so, transmit a notification of the item for sale to the user 132. In some embodiments, the server machine 110 may transmit a message to the seller of the item for sale that the user 132 may be interested in the item for sale.

In notifying the seller or the user 132 about the match between the first item and the item for sale, the server machine 110 may determine whether to withhold notification to the buyer or the user 132, based on logic, sale criteria, the plurality of subjective estimations of value, feedback scores, or other criteria. For example, the server machine 110 may determine that regardless of a match between the first item and the item for sale, the user 132 has not designated sufficient interest in purchasing the item, or that the notification should be withheld until a predetermined notification time.

In operation 570, the server machine 110 displays the one or more third items. In some embodiments, to display the one or more third items, the server machine 110 may generate a list of the one or more third items and transmit the list to the device 130 for display to the user 132 on the device 130.

Figure 16:
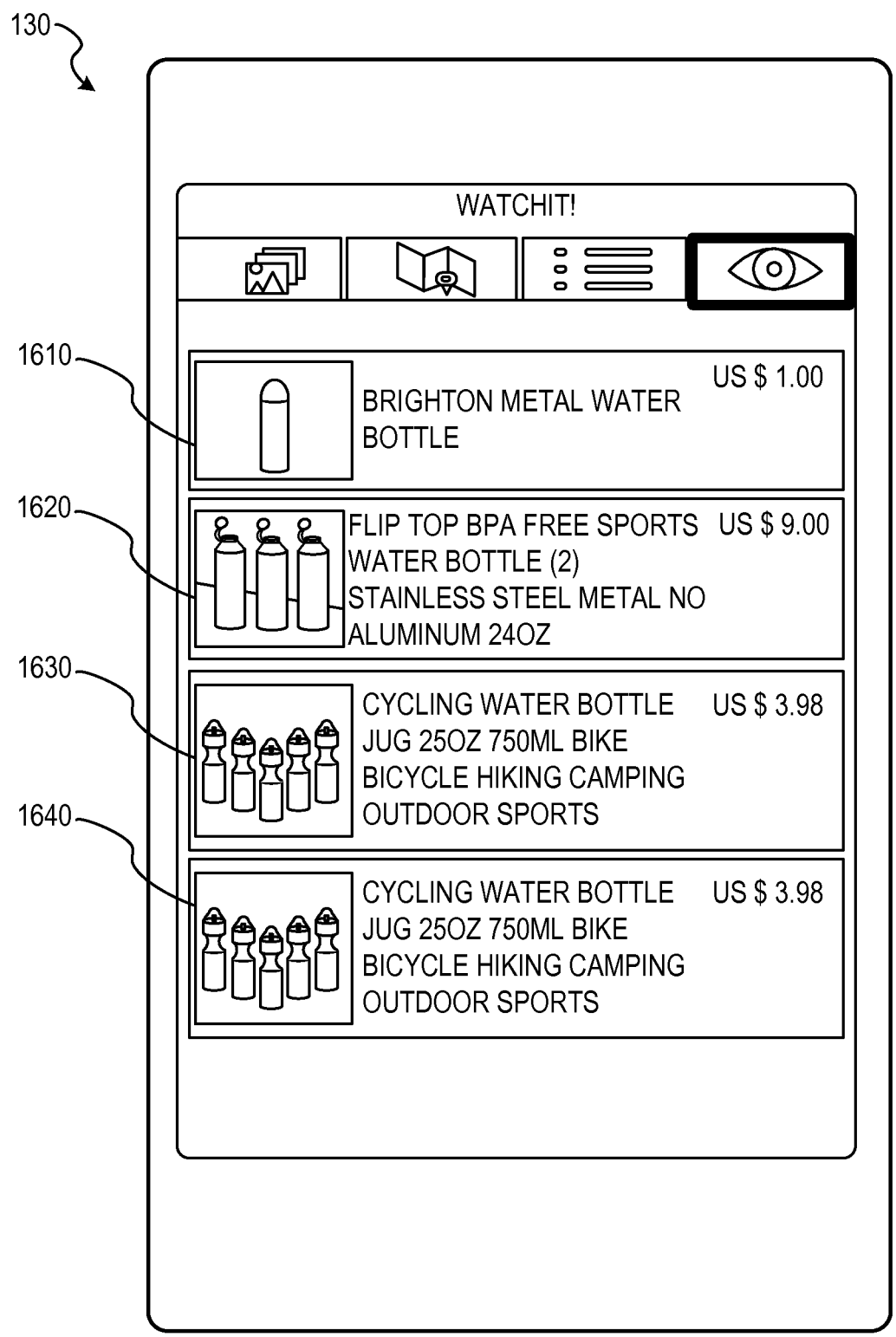
FIG. 16 is an illustration of an example graphical user interface of a client device, according to some example embodiments.

As shown in FIG. 16, the results of the query to the marketplace 120 may be the set of third items 1610-1640. The server machine 110 may cooperate with the marketplace 120 to perform operations on the results of the query. For example, the server machine 110 may cooperate with the marketplace 120 to enable the user 132 to tag, share on social media, watch, bid on, sort into folders for later viewing, view, or otherwise interact with the set of third items in the results of the query.

Figure 17:
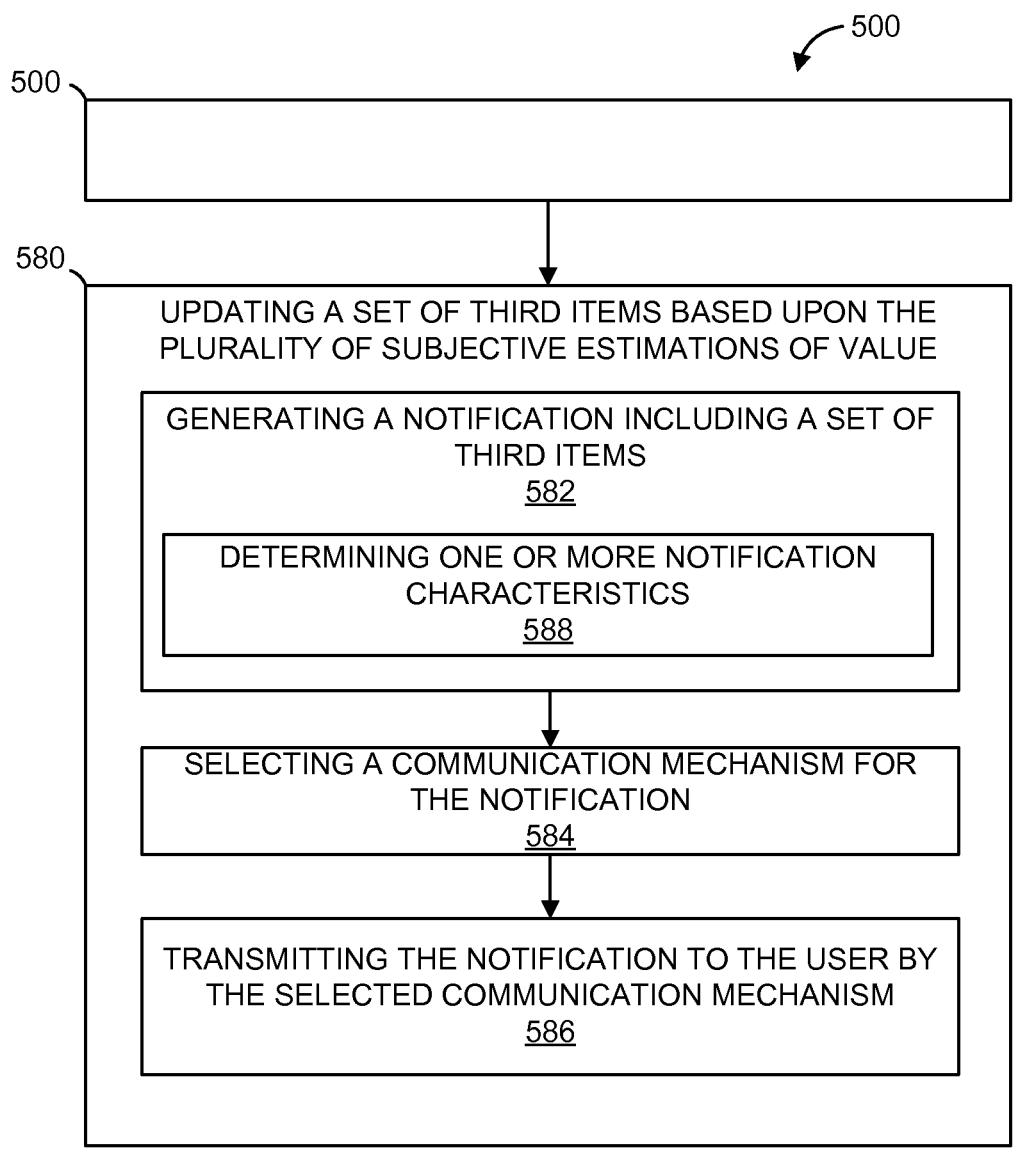
FIG. 17 is a flowchart illustrating operations of a device performing a method of matching buyers to sellers using the calibrated user profile and the calibrated notification model, according to some example embodiments.

In some embodiments, as shown in FIG. 17, the method 500 may further include operation 580. In operation 580, the server machine 110 updates the set of third items based upon the plurality of subjective estimations of value. For example, the server machine 110 can generate notifications to periodically notify the user 132 of items which have newly been added to the marketplace 120 which correspond to the one or more search terms or otherwise match the first item depicted in the image received from the user 132.

The server machine 110 may use user preferences of the user 132 (e.g., urgency, how much willing to spend, how much wanted) and available items on the marketplace 120 to create a user preference category item value to determine frequency of the automated search and update of the set of third items. For example, where the marketplace 120 hosts auctions, the server machine 110 may use aspects of the auction (e.g., many similar items, items in a category) to assist in creating the user preference category item value. The server machine 110 may also use merchandising of items, deals, recommendations for bid prices, periodicity and channel alerts (e.g., application push notification, email digest notification, etc.) to assist in creating the user preference category item value.

Figure 18:
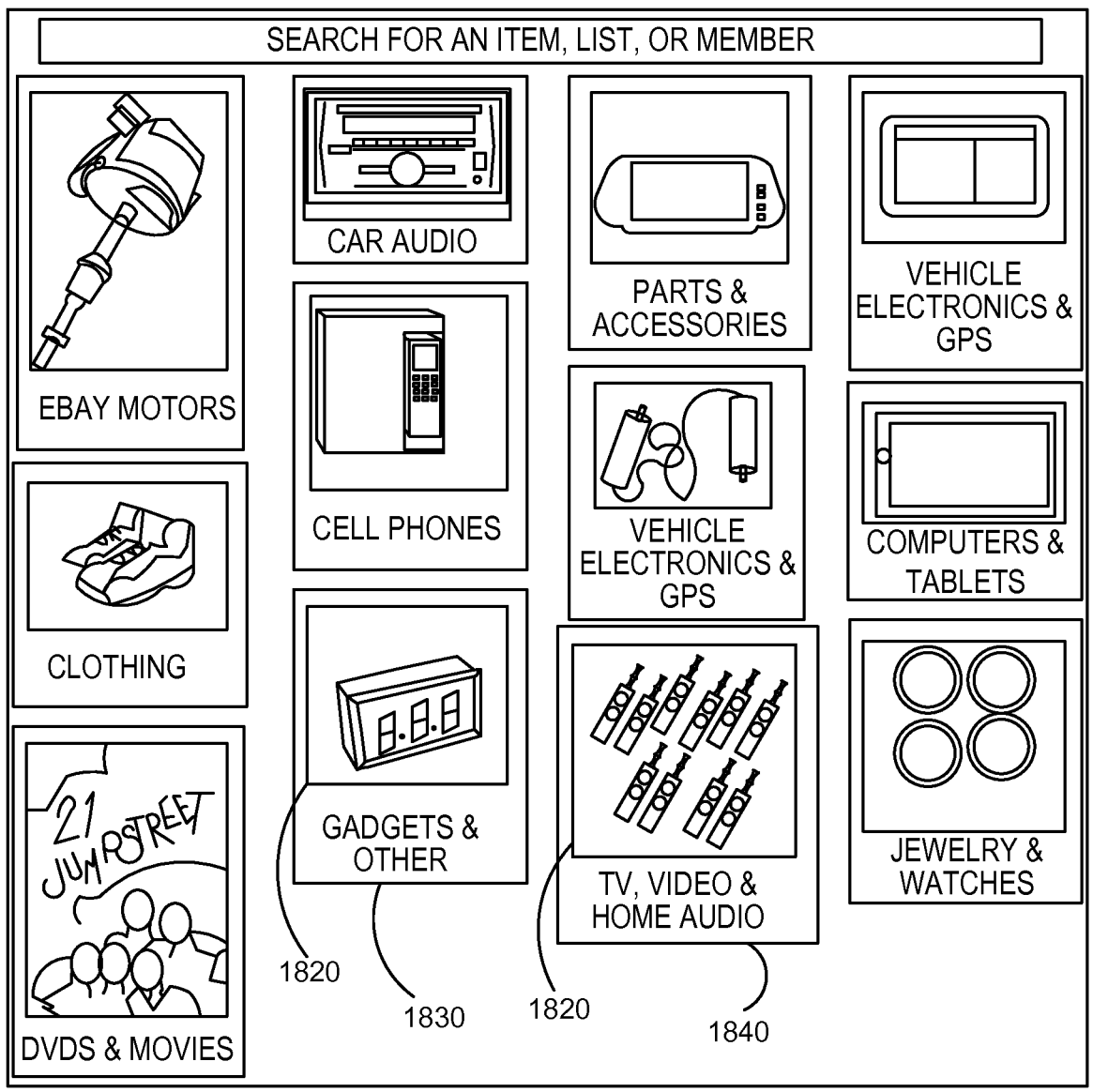
FIG. 18 is an illustration of an example graphical user interface of a client device, according to some example embodiments.

In some embodiments, the server machine 110 may integrate the photographs organized by the user 132 and the set of third items, as shown in FIG. 18. For example, the server machine 110 may combine the photographs or items in which the user 132 has shown interest and the set of third items by organizing photographs 1810 and 1820 using predetermined categories 1830 and 1840. For example, content categories derived from the marketplace 120 structures, may be selected through a social network analysis of user behavior. The server machine 110 may perform the analysis of user behavior, determine categories, and present the categories that would potentially be most relevant to each individual user. In addition user behavior analysis may allow the server machine 110 to present recommendations that are timely or trending in a social media circle, since social networks may be created or influenced by recent activity. This user behavior analysis may enable creation of a weighted list, allowing the server machine 110 to present a more expansive browsing experience, including not only the items in which the user 132 has shown prior interest, but to include relevant items in which the entire population of users of the server machine 110 have shown interest.

In some embodiments, the operation 580 may include operation 582, in which the server machine 110 generates a notification including the set of third items. Based on the plurality of subjective estimations of value, in operation 584, the server machine 110 may select a communication mechanism for the notification from a plurality of communication mechanisms. In operation 586, the server machine 110 may transmit the notification to the user by the selected communication mechanism.

In conjunction with operation 582, the server machine 110 may perform operation 588, in which the server machine 110 determines one or more notification characteristics of the notification, based on the plurality of subjective estimations of value. The one or more notification characteristics includes a notification type, a notification frequency, an associated action, a notification interaction option, or a notification presentation.

The notification type may include SMS notifications, emails, text messages, IM notifications, calendar reminders, social media posts, social media notifications, or the like. The server machine 110 enables the user 132 to set rules on notification types based on the plurality of subjective estimations of value. The user 132 may authorize the server machine 110 to send email reminders but not SMS notifications on items which have a low want or low need value, as indicated by the plurality of subjective estimations of value below a threshold as discussed below.

The notification frequency may be determined for repeating the same or similar notifications. For example, based on the plurality of subjective estimations of value, the frequency can be determined to repeat the notification hourly, daily, weekly, monthly, quarterly, or other time intervals. The frequency may also be determined to repeat the notification based on an action or an event. For example, the notification may repeat every time a specific item is entered into a shopping list, every time a car is determined to need an oil change, each time a predetermined item is purchased using the marketplace 120, or other actions or events.

In operation 584, for example, the server machine 110 may select between available communication mechanisms for the user 132 which are available to the server machine 110. In some embodiments, the user 132 may register one or more communication mechanisms or channels with the server machine 110, such as a telephone number, an email address, a social media account, a shipping address, a home address, a billing address, or the like. In selecting between the available communication mechanisms based on the plurality of subjective estimations of value, the server machine 110 may use metadata entered by the user in conjunction with the communication mechanism, such as a set of available times of communication associated. For example, the user may enter metadata associated with a home telephone number indicating times of day in which the user 132 may be contacted at that number. By way of further example, where the user 132 has provided the server machine 110 with a mobile telephone number, the user 132 may indicate times or days in which text messages, SMS messages, or other text based communication may be received, times or days in which voice calls may be received, and times and days in which other forms of electronic communication may be received by the mobile telephone. For example, the user 132 may only enable access of social media accounts on the mobile telephone on weekdays after 5:00 p.m.

Further, in some embodiments, the server machine 110 may select between available communication mechanisms based on the context of the communication mechanism in conjunction with the plurality of subjective estimations of value. For example, where the user 132 has provided a mobile telephone as a communication channel, the user 132 may provide metadata for usage of the mobile telephone to determine contexts under which the mobile telephone may be an available communication mechanism. For example, the user 132 provide the server machine 110 with one or more locations, holidays, during a commute, or other temporal, geographical, or situational contexts under which the mobile telephone is not an appropriate contact method. The server machine 110 may determine that based on the plurality of subjective estimations of value and the context of the communication channel that the mobile telephone is not an available communication mechanism. For example, where the user 132 has indicated that the a need for an item is low, a desire for the item is equally positioned between the minimum predetermined value and the maximum predetermined value, and that the price willing to be paid for the item is low and the user 132 is currently in a commute, traveling at a high rate of speed in a car, the server machine 110 may determine that the mobile telephone is not an available communication mechanism.

In some embodiments, the server machine 110 may select between available communication mechanisms based on the plurality of subjective estimations of value and the one or more actions of the user 132 with respect to the previous instances of the plurality of subjective estimations of value. For example, where the user 132 has indicated a median need for an item, a median desire for the item, and a high acceptable price for an item, and the user 132 has previously and repeatedly purchased items after indicating a median need, a median desire, and a high acceptable price, the server machine 110 may determine that a relative likelihood of conversion of the item, where the user 132 will purchase the item based upon a notification of availability of the item. The server machine 110 may then select one or more of the available communication mechanisms for transmitting a notification, by operation 586.

In some embodiments, at least a portion of the method 500 may be represented by pseudo code indicative of a portion of the algorithm described above. For example, the algorithm may be represented by:

```
DESIRED_ITEMS = <Desired items for a given user>
ITEMS_FOR_SALE = <The vector of all items for sale and related item data, i.e., seller info,
auction end date, etc>
for (ITEM in DESIRED_ITEMS) {
    DESIRED_ITEM_WANT = <Want position of the slider>
    DESIRED_ITEM_NEED = <Need position of the slider>
    DESIRED_ITEM_SPEND = <Spend position of the slider>
    DESIRED_ITEM_CAT = <The full category path of the desired item, i.e., "Sports
Gear:Men's Running Shoe" or "Bicycles:Racing Bikes">
    ITEM_BUYER       = <The user who wants to buy the item>
    # Match user's stated levels of desire and urgency to determine what seller's items may be
appropriate to connect the two
    SELLER_MATCHES = { } # Associative array of items to notify each seller about
    BUYER_MATCHES = { } # Similar associative array of items to notify the (potential) buyer
about
    DISTANCE_THRESHOLD = <Number used for weighting to determine threshold for which
desired items to send to the seller (or vice versa)>
    for (SALE_ITEM in ITEMS_FOR_SALE) {
        SALE_ITEM_WANT = <Floating point measure determining this item's correlated
"want" score>
        SALE_ITEM_NEED = < Floating point measure determining this item's correlated "need"
score>
        SALE_ITEM_SPEND = < Floating point measure determining this item's correlated
"spend" score>
        SALE_ITEM_CAT = <This item's full category path>
        ITEM_SELLER = <User selling this item>
        # Get individual differences between desired item and item for sale
        WANT_DIST = <Distance between DESIRED_ITEM_WANT and SALE_ITEM_CAT>
        NEED_DIST = <Distance between DESIRED_ITEM_NEED and SALE_ITEM_NEED>
        SPEND_DIST = <Distance between DESIRED_ITEM_SPEND and
SALE_ITEM_SPEND>
        CAT_DIST = <Levenshtein Distance between DESIRED_ITEM_CAT and
SALE_ITEM_CAT>
        TOTAL_DIST = <Distance between desired item and item for sale in multi-dimensional
space using the values above>
        if (TOTAL_DIST < DISTANCE_THRESHOLD) {
            SELLER_MATCHES[ITEM_SELLER] = ITEM
            BUYER_MATCHES[ITEM_BUYER] = SALE_ITEM
        }
    }
    # Finally, notify any sellers about these desired items
    for (ITEM_SELLER, ITEM in SELLER_MATCHES) {
        # Potential additional conditional logic to skip sellers based on any other criteria
        notify seller(ITEM_SELLER, ITEM)
    }
    # Additionally, notify the buyer that an item matching something they wanted is available
    for (ITEM_BUYER, SALE_ITEM in BUYER_MATCHES) {
        # Potential additional conditional logic to skip buyers based on any other criteria
        # NOTE: the notify_buyer function would be where the System Action Model may be
implemented, as described below
        notify_buyer(ITEM_BUYER, SALE_ITEM)
    }
}
```

In some example embodiments, the subjective estimations of value can be used in a health monitoring or exercising application on the user device 130 and used to interact with the server machine 110. For example, the plurality of subjective estimations of value may be indicative of parameters relating to exercise to build a user model, preference model, emotional attachment model, or other profiles or models indicative of the user 132. Further the health application can use the plurality of subjective estimations of value to pair the user 132 with a local gym, health club, personal trainer, or other users of the health application via the health application cooperating with one or more social media applications or web sites, for example. Here, the user 132 may adjust sliders for subjective estimations of value of exercise times, weather conditions for exercising, level of commitment, level of desire, enjoyment of an exercise, location preference for an exercise, food intake, food preferences, interest in a type of exercise, or the like. The user 132 can also enter into the application user actions indicative of actual exercises, including distances, weights, times, or other exercise metrics; food intake; food type; exercises missed; reasons for exercises missed; and the like. The server machine 110 may calibrate a user profile based on the subjective estimations of value and the user actions to determine probability of exercise or dietary actions that the user 132 will take in the future. The server machine 110 or the health application may use the user profile or probability of future user actions to make recommendations, suggest adjustments in an exercise program or dietary program, determine likely users to recommend to the user 132, determine a personal trainer for the user 132, determine a gym for the user 132, or the like, based on the calibrated user profile.

Although discussed in reference to a marketplace 120 and a health application, it will be understood by one skilled in the art that the methods and systems disclosed herein may be used in conjunction with differing applications, systems, actions, and the like without departing from the teachings of the present disclosure.

According to various example embodiments, one or more of the methodologies described herein may facilitate matching buyers and sellers using calibrated user profiles and notification models. Moreover, one or more of the methodologies described herein may facilitate generation and calibration of user profiles, and notification models.

When these effects are considered in aggregate, one or more of the methodologies described herein may obviate a need for certain efforts or resources that otherwise would be involved in matching buyers and sellers using calibrated user profiles and notification models. Efforts expended by a user in finding buyers or sellers and determining when and where notifications may be transmitted to the user may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 19:
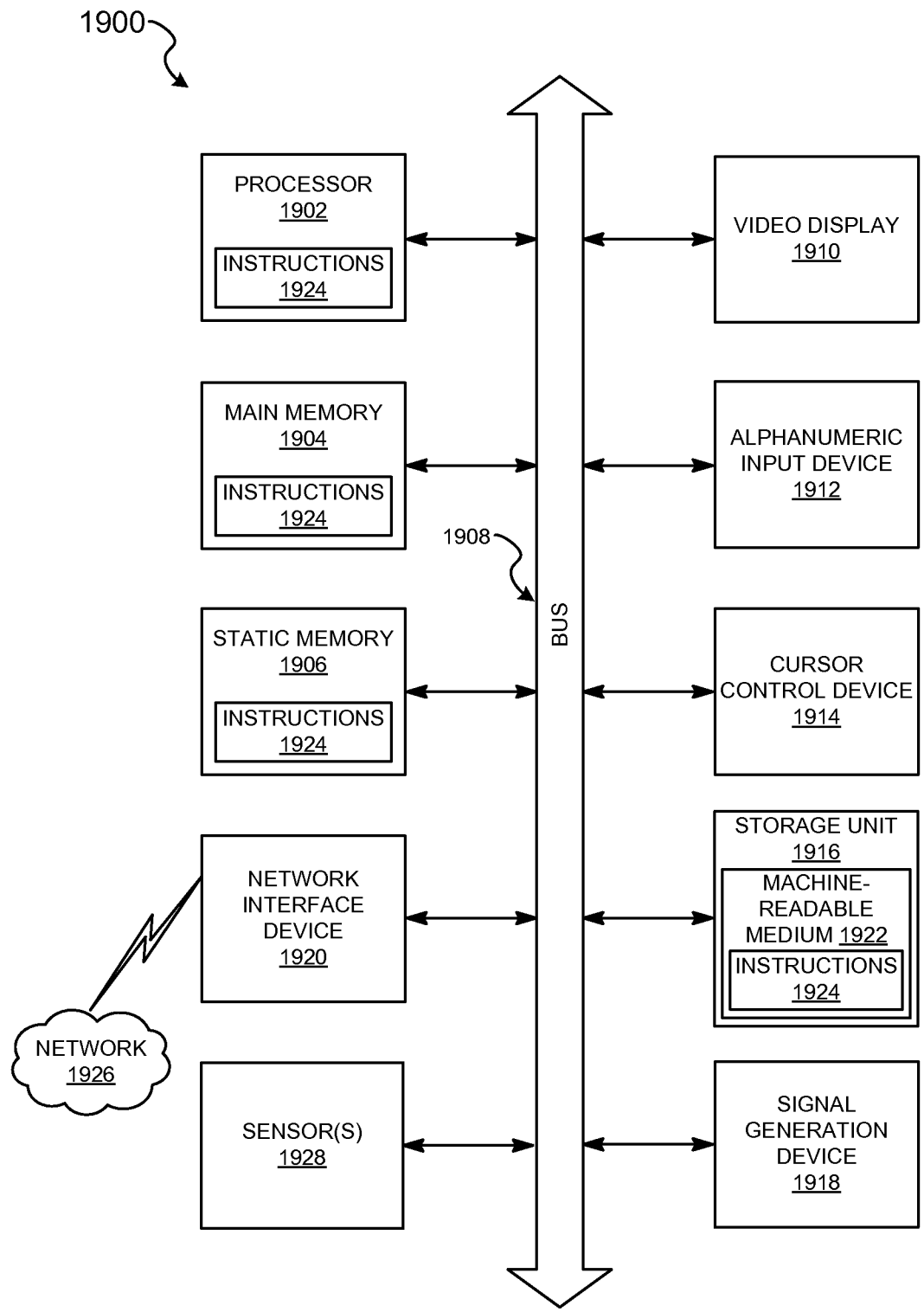
FIG. 19 is a block diagram illustrating components of a machine, according to some example embodiments, able to read instructions from a machine-readable medium and perform any one or more of the methodologies discussed herein.

FIG. 19 is a block diagram illustrating components of a machine 1900, according to some example embodiments, able to read instructions 1924 from a machine-readable medium 1922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 19 shows the machine 1900 in the example form of a computer system (e.g., a computer) within which the instructions 1924 (e.g., software, a program, an application, an applet, an app, or other executable code) for causing the machine 1900 to perform any one or more of the methodologies discussed herein may be executed, in whole or in part.

In alternative embodiments, the machine 1900 operates as a standalone device or may be communicatively coupled (e.g., networked) to other machines. In a networked deployment, the machine 1900 may operate in the capacity of a server machine or a client machine in a server-client network environment, or as a peer machine in a distributed (e.g., peer-to-peer) network environment. The machine 1900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1924, sequentially or otherwise, that specify actions to be taken by that machine. Further, while only a single machine is illustrated, the term "machine" shall also be taken to include any collection of machines that individually or jointly execute the instructions 1924 to perform all or part of any one or more of the methodologies discussed herein.

The machine 1900 includes a processor 1902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1904, and a static memory 1906, which are configured to communicate with each other via a bus 1908. The processor 1902 may contain microcircuits that are configurable, temporarily or permanently, by some or all of the instructions 1924 such that the processor 1902 is configurable to perform any one or more of the methodologies described herein, in whole or in part. For example, a set of one or more microcircuits of the processor 1902 may be configurable to execute one or more modules (e.g., software modules) described herein.

The machine 1900 may further include a graphics display 1910 (e.g., a plasma display panel (PDP), a light emitting diode (LED) display, a liquid crystal display (LCD), a projector, a cathode ray tube (CRT), or any other display capable of displaying graphics or video). The machine 1900 may also include an alphanumeric input device 1912 (e.g., a keyboard or keypad), a cursor control device 1914 (e.g., a mouse, a touchpad, a trackball, a joystick, a motion sensor, an eye tracking device, or other pointing instrument), a storage unit 1916, an audio generation device 1918 (e.g., a sound card, an amplifier, a speaker, a headphone jack, or any suitable combination thereof), and a network interface device 1920.

The storage unit 1916 includes the machine-readable medium 1922 (e.g., a tangible and non-transitory machine-readable storage medium) on which are stored the instructions 1924 embodying any one or more of the methodologies or functions described herein. The instructions 1924 may also reside, completely or at least partially, within the main memory 1904, within the processor 1902 (e.g., within the processor's cache memory), or both, before or during execution thereof by the machine 1900. Accordingly, the main memory 1904 and the processor 1902 may be considered machine-readable media (e.g., tangible and non-transitory machine-readable media). The instructions 1924 may be transmitted or received over the network 150 via the network interface device 1920. For example, the network interface device 1920 may communicate the instructions 1924 using any one or more transfer protocols (e.g., hypertext transfer protocol (HTTP)).

In some example embodiments, the machine 1900 may be a portable computing device, such as a smart phone or tablet computer, and have one or more additional input components 1930 (e.g., sensors or gauges). Examples of such input components 1930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1924 for execution by the machine 1900, such that the instructions 1924, when executed by one or more processors of the machine 1900 (e.g., processor 1902), cause the machine 1900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    causing, by at least one processor of a server machine, presentation of a graphical user interface at a client device, the graphical user interface comprising one or more user-selectable instrumentalities that each enable a user to provide a user-defined, subjective estimation of value of an item, relative to a minimum value and a maximum value;
    receiving, by at least one processor of the server machine, a plurality of subjective estimations of value from the client device, the plurality of subjective estimations of value including a value describing the user's subjective desire to own the item relative to a qualitative minimum desire to own value and a qualitative maximum desire to own value;
    generating, by at least one processor of the server machine, a user profile for the user of the client device based on the plurality of subjective estimations of value;
    receiving, from the client device, an image depicting an item;
    determining, by at least one processor of the server machine, at least one characteristic of the item depicted in the image;
    calibrating, by at least one processor of the server machine, the user profile based on the at least one characteristic;
    identifying, by at least one processor of the server machine, at least one different image depicting a different item that shares the at least one characteristic;
    extracting, by at least one processor of the server machine, metadata from the at least one different image and conducting a search for items based on the metadata; and
    causing presentation of a notification within the graphical user interface at the client device that includes a result of the search for items.

2. The method of claim 1 further comprising:
    receiving, from the client device, data indicative of a plurality of communication mechanisms by which to transmit the notification to the client device.

3. The method of claim 2, wherein causing presentation of the notification comprises:
    selecting one of the plurality of communication mechanisms by which to transmit the notification to the client device and transmitting the notification to the client device using the selected communication mechanism.

4. The method of claim 1, wherein determining the at least one characteristic of the item depicted in the image is performed based on metadata associated with the image.

5. The method of claim 1, wherein identifying the at least one different image depicting the different item sharing the at least one characteristic comprises searching a marketplace database using information included in the calibrated user profile.

6. The method of claim 1, further comprising:
    identifying a set of items from a database of a network-based publication system using one or more search terms determined based on metadata extracted from at least one item included in the result of the search for items.

7. The method of claim 1, wherein receiving the image comprises detecting a placement of the image into a storage location associated with the user profile.

8. The method of claim 1, wherein receiving the image comprises detecting a share of the image, by the user profile, with at least one different user profile.

9. The method of claim 1, wherein receiving the image comprises detecting at least one of a comment on the image by the user profile or an indication of interest in the image by the user profile.

10. A server machine, comprising:
one or more processors; and
processor executable instructions accessible on a non-transitory machine-readable medium that, when executed, cause the one or more processors to perform operations comprising:
causing presentation of a graphical user interface at a client device, the graphical user interface comprising one or more user-selectable instrumentalities that each enable a user to provide a user-defined, subjective estimation of value of an item, relative to a minimum value and a maximum value;
receiving a plurality of subjective estimations of value from the user of the client device, the plurality of subjective estimations of value including a value describing the user's subjective desire to own a particular item for sale relative to a qualitative minimum desire to own value and a qualitative maximum desire to own value;
generating a user profile for the user based on the plurality of subjective estimations of value;
detecting an interaction between the user profile and an image depicting at least one item and identifying a plurality of characteristics associated with the item;
calibrating the user profile based on the plurality of characteristics of the at least one item;
performing a search for at least one additional item based on the plurality of characteristics and additional information included in the calibrated user profile; and
causing presentation of a notification within the graphical user interface at the client device that includes a result of the search.

11. The server machine of claim 10, the operations further comprising determining a probability of a user action with respect to at least one item included in the result of the search based on the plurality of subjective estimations of value and the plurality of characteristics of the at least one item.

12. The server machine of claim 11, the operations further comprising receiving data indicative of a plurality of communication mechanisms by which to the notification to the client device, wherein causing presentation of the notification is performed using one of the plurality of communication mechanisms.

13. The server machine of claim 7, wherein the interaction between the user profile and the image depicting the at least one item comprises a placement of the image into a folder of images associated with the user profile.

14. The server machine of claim 7, wherein the interaction between the user profile and the image depicting the at least one item comprises a share of the image by the user profile with at least one different user profile.

15. The server machine of claim 7, wherein the image depicting the at least one item comprises an image posted to a social network site by at least one other user profile and the interaction between the user profile and the image depicting the at least one item comprises a comment by the user profile on the image.

16. The server machine of claim 7, wherein the image depicting the at least one item comprises an image posted to a social network site by at least one other user profile and the interaction between the user profile and the image depicting the at least one item comprises an indication of interest in the image by the user profile.

17. A non-transitory machine-readable storage medium comprising processor executable instructions that, when executed by a processor of a machine, cause the machine to perform operations comprising:
causing presentation of a graphical user interface at a client device, the graphical user interface comprising one or more user-selectable instrumentalities that each enable a user to provide a user-defined, subjective estimation of value of an item relative to a minimum value and a maximum value;
receiving a plurality of subjective estimations of value from the user of the client device, the plurality of subjective estimations of value including a value describing the user's subjective desire to own a particular item for sale relative to a qualitative minimum desire to own value and a qualitative maximum desire to own value;
generating a user profile for the user based on the plurality of subjective estimations of value;
detecting an upload of an image depicting at least one item to a storage location associated with the user profile;
identifying one or more characteristics of the at least one item by performing image analysis on the image responsive to detecting the upload;
calibrating the user profile based on the one or more characteristics;
performing image analysis on a database of images using the one or more characteristics included in the calibrated user profile and identifying at least one different image depicting a different item sharing the one or more characteristics; and
causing presentation of a notification including the at least one different image within the graphical user interface at the client device.

18. The non-transitory machine-readable storage medium of claim 17, the operations further comprising:
receiving, from the client device, data indicative of a plurality of communication mechanisms by which to transmit the notification to the client device;
selecting a communication mechanism of the plurality of communication mechanisms by which to transmit the notification to the client device based on the calibrated user profile; and
transmitting the notification to the client device by the selected communication mechanism.

19. The non-transitory machine-readable storage medium of claim 17, the operations further comprising:
extracting one or more search terms from metadata of the at least one different image;
identifying a set of similar items from the database using the one or more search terms; and
including at least one item from the set of similar items in the notification.

20. The non-transitory machine-readable storage medium of claim 17, the plurality of subjective estimations of value further comprising:
a value describing the user's subjective need to own the particular item for sale relative to a qualitative minimum need to own value and a qualitative maximum need to own value; and
a value describing an amount the user is willing to spend to own the particular item for sale relative to a minimum spend value and a maximum spend value.

* * * * *